United States Patent
Ogoe et al.

(10) Patent No.: US 6,329,450 B1
(45) Date of Patent: Dec. 11, 2001

(54) THERMOPLASTIC COMPOSITIONS OF INTERPOLYMERS OF ALPHA-OLEFIN MONOMERS WITH ONE OR MORE VINYL OR VINYLIDENE AROMATIC MONOMERS AND/OR ONE OR MORE HINDERED ALIPHATIC OR CYCLOALIPHATIC VINYL OR VINYLIDENE MONOMERS BLENDED WITH ENGINEERING THERMOPLASTICS

(75) Inventors: Samuel A. Ogoe, Missouri City; Charles F. Diehl, Lake Jackson; Leo A. Novak, Lake Jackson; Wendy D. Hoenig, Lake Jackson; Shaofu Wu, Missouri City; Donna C. Scott, Brazoria, all of TX (US)

(73) Assignee: The Dow Chemical Company, Midland, MI (US)

( * ) Notice: Subject to any disclaimer, the term of this patent is extended or adjusted under 35 U.S.C. 154(b) by 0 days.

(21) Appl. No.: 09/260,450

(22) Filed: Mar. 2, 1999

Related U.S. Application Data
(60) Provisional application No. 60/077,663, filed on Mar. 11, 1998.

(51) Int. Cl.$^7$ .................................................. C08L 1/00
(52) U.S. Cl. ........................ 524/35; 524/109; 524/140; 524/155; 524/161; 524/409; 525/108; 525/132; 525/133; 525/146; 525/148; 525/164; 525/166; 525/177; 525/179; 525/184; 525/208; 525/227; 525/240
(58) Field of Search .................... 524/35, 140, 109, 524/155, 161, 409; 525/108, 132, 133, 146, 148, 155, 164, 166, 177, 179, 184, 208, 227, 240

(56) References Cited

U.S. PATENT DOCUMENTS

| | | | |
|---|---|---|---|
| 3,431,224 | 3/1969 | Goldblum | 260/13 |
| 3,477,919 | 11/1969 | Lichtenwalter et al. | 203/36 |
| 3,477,979 | 11/1969 | Hillyer | 260/29.2 |
| 3,786,105 | 1/1974 | Nakashio et al. | 260/897 |
| 4,076,698 | 2/1978 | Anderson et al. | 526/348.6 |
| 4,172,859 | 10/1979 | Epstein | 428/402 |
| 4,393,191 | 7/1983 | East | 528/207 |
| 4,430,476 | 2/1984 | Liu | 525/67 |
| 4,456,732 | 6/1984 | Nambu et al. | 525/65 |
| 4,469,843 | 9/1984 | Lordi | 525/67 |
| 4,476,274 | 10/1984 | Liu | 524/445 |
| 4,496,693 | 1/1985 | Rosenquist et al. | 525/146 |
| 4,529,791 | 7/1985 | Glass | 528/196 |
| 4,537,930 | 8/1985 | Bussink et al. | 524/505 |
| 4,612,216 * | 9/1986 | Kurfman . | |
| 4,677,162 | 6/1987 | Grigo et al. | 525/67 |
| 4,786,686 | 11/1988 | Laughner et al. | 525/67 |
| 5,055,438 | 10/1991 | Canich | 502/117 |
| 5,057,475 | 10/1991 | Canich et al. | 502/104 |
| 5,064,802 | 11/1991 | Stevens et al. | 502/155 |
| 5,096,867 | 3/1992 | Canich et al. | 502/103 |
| 5,132,106 | 7/1992 | Tuloup et al. | 424/70 |
| 5,132,380 | 7/1992 | Stevens et al. | 526/126 |
| 5,162,445 | 11/1992 | Powers et al. | 525/333.4 |
| 5,180,788 | 1/1993 | Vroomans | 525/285 |
| 5,189,091 | 2/1993 | Laughner | 524/445 |
| 5,272,236 | 12/1993 | Lai et al. | 526/348.5 |
| 5,278,272 | 1/1994 | Lai et al. | 526/348.5 |
| 5,280,066 | 1/1994 | Tekkanat et al. | 525/64 |
| 5,347,024 | 9/1994 | Nickias et al. | 556/11 |
| 5,350,723 | 9/1994 | Neithamer et al. | 502/104 |
| 5,374,696 | 12/1994 | Rosen et al. | 526/126 |
| 5,399,635 | 3/1995 | Neithamer et al. | 526/126 |
| 5,416,148 | 5/1995 | Farah et al. | 524/409 |
| 5,460,818 | 10/1995 | Park et al. | 426/415 |
| 5,470,993 | 11/1995 | Devore et al. | 556/11 |
| 5,703,187 | 12/1997 | Timmers | 526/282 |
| 5,721,185 | 2/1998 | LaPointe et al. | 502/117 |

FOREIGN PATENT DOCUMENTS

| | | |
|---|---|---|
| 0416815 A2 | 3/1991 | (EP) . |
| 0 558 048 B1 | 1/1993 | (EP) . |
| 120853 * | 6/1986 | (JP) . |
| 95/32095 | 11/1995 | (WO) . |
| 98/09999 | 3/1998 | (WO) . |

OTHER PUBLICATIONS

Y.W. Cheung, M.J. Guest, *Proc. Antec'96*, pp 1634–1637.
J.C. Randall, *Polymer Sequence Determination, Carbon–13 NMR Method*, Academic Press New York, 1977, pp. 71–78.
Randall (*Rev. Macromol Chem. Phys.*), C29 (2&3), p. 285–297.
Ramamurthy, *Journal of Rheology*, vol. 30, pp. 337–357, (1986).

* cited by examiner

*Primary Examiner*—David J. Buttner

(57) ABSTRACT

The present invention relates to a blend of polymeric materials comprising;
  (A) of from about 1 to about 80 percent by weight (based on the combined weights of Components A and B) of at least one substantially random interpolymer; wherein said interpolymer;
  (1) contains of from about 0.5 to about 50 mole percent of polymer units derived from;
    a) at least one vinyl or vinylidene aromatic monomer, or
    b) at least one hindered aliphatic or cycloaliphatic vinyl or vinylidene monomer, or
    c) a combination of at least one vinyl or vinylidene aromatic monomer and at least one hindered aliphatic or cycloaliphatic vinyl or vinylidene monomer;
  (2) contains of from about 50 to about 99.5 mole percent of polymer units derived from at least one aliphatic α-olefin having from 2 to 20 carbon atoms;
  (3) has a melt index ($I_2$) of from about 0.01 to about 100 g/10 min; and
  (4) has a molecular weight distribution ($M_w/M_n$) of from about 1.5 to about 20;
  (B) of from about 20 to about 99 weight percent based on the combined weights of Components A, and B of one or more engineering thermoplastics.

20 Claims, No Drawings

THERMOPLASTIC COMPOSITIONS OF INTERPOLYMERS OF ALPHA-OLEFIN MONOMERS WITH ONE OR MORE VINYL OR VINYLIDENE AROMATIC MONOMERS AND/OR ONE OR MORE HINDERED ALIPHATIC OR CYCLOALIPHATIC VINYL OR VINYLIDENE MONOMERS BLENDED WITH ENGINEERING THERMOPLASTICS

CROSS-REFERENCE TO RELATED APPLICATIONS

This application claims the benefit of U.S. provisional application No. 60/077,663 filed on Mar. 11, 1998.

STATEMENT REGARDING FEDERALLY SPONSORED RESEARCH OR DEVELOPMENT

Not Applicable

BACKGROUND OF THE INVENTION

This invention relates to thermoplastic compositions of interpolymers of α-olefin monomers with one or more vinyl or vinylidene aromatic monomers and/or one or more hindered aliphatic or cycloaliphatic vinyl or vinylidene monomers blended with one or more engineering thermoplastics.

The generic class of materials of α-olefin/hindered vinyl or vinylidene monomer substantially random interpolymers, including materials such as α-olefin/vinyl aromatic monomer interpolymers, and their preparation, are known in the art, such as described in EP 416 815 A2. These materials, such as ethylene/styrene interpolymers, offer a wide range of material structures and properties which makes them useful for varied applications, such as asphalt modifiers or as compatibilizers for blends of polyethylene and polystyrene, as described in U.S. Pat. No. 5,460,818.

The structure, thermal transitions and mechanical properties of substantially random interpolymers of ethylene and styrene containing up to about 50 mole percent styrene have been described (Y. W. Cheung, M. J. Guest; Proc. Antec '96 pages 1634–1637). These polymers are found to have glass transitions in the range −20° C. to +35° C., and show no measurable crystallinity above about 25 mole percent styrene incorporation, i.e. they are essentially amorphous.

Engineering thermoplastics are defined in the third edition of the Kirk-Othmer Encyclopedia of Science and Technology as thermoplastic resins, neat or unreinforced or filled, which maintain dimensional stability and most mechanical properties above 100° C. and below 0° C. Thermoplastics such as polycarbonate have found many uses because, in general, they combine a high level of heat resistance toughness and dimensional stability with good insulating and non-corrosive properties, and are easily molded. Polycarbonate does however, suffer from a tendency to craze and crack under the effect of contact with organic solvents such as gasoline. An undesirable result in polycarbonate which has crazed is that it is more likely to experience brittle rather than ductile failure.

This disadvantage has been somewhat relieved by the practice of blending polycarbonate with various olefin polymers such as low density polyethylene or linear low density polyethylene, or thermoplastic rubbers such as ethylene/propylene copolymer These added substances are capable of improving the resistance of polycarbonate to solvents, but they tend to delaminate and cause an offsetting reduction in the toughness, impact resistance and weldline strength of the blended polycarbonate composition. Such delamination, and the resulting loss of utility, is reported, for example, in U.S. Pat. No. 4,496,693. In addition such polycarbonate/olefin polymer blends show high gloss, significant pearlescence, as well as solid opaque appearance.

In many automotive interior applications, such as instrument panel, head impact and interior trim, thermoplastic resins having good impact resistance, colorability and aesthetically pleasing attributes are essential.

Impact resistance in polycarbonate can be improved by the incorporation of emulsion or core-shell elastomers such as methacrylate/butadiene/styrene copolymer or a butyl acrylate rubber. However, these core-shell rubbers hinder processability of the blend by increasing viscosity. It would accordingly be desirable if modifers blended with polycarbonate for the purpose of improving its impact resistance did not also deleteriously affect its processability, and cause delamination as evidenced by peeling or splintering in a molded article.

The purpose of this invention is to provide novel blend compositions comprising one or more engineering thermoplastics and at least one substantially random interpolymer of one or more α-olefin monomers with one or more vinyl or vinylidene aromatic monomers and/or one or more hindered aliphatic or cycloaliphatic vinyl or vinylidene monomers.

The blend compositions can exhibit a unique balance of properties including high heat distortion temperature, excellent miscibility with no delamination and no pearlescence, excellent processability and good colorability when injection molded into various parts. In addition when the substantially random interpolymer component of the blend has high levels of vinyl or vinylidene aromatic monomer or hindered aliphatic or cycloaliphatic vinyl or vinylidene monomer content (greater than about 36 mol %) then enhanced optical properties are observed including diminishing opacity and the generation of an almost translucent appearance in the fabricated part.

As a further embodiment, the invention provides novel blend compositions comprising one or more engineering thermoplastics, and at least one substantially random interpolymer of one or more α-olefin monomers with one or more vinyl or vinylidene aromatic monomers and/or one or more hindered aliphatic or cycloaliphatic vinyl or vinylidene monomers in combination with one or more polyolefin elastomers and one or more ethylene-methyl acrylate-glycidyl methacrylate-styrene acrylonitrile multi polymer blends.

These blend compositions allow for the manufacture of PC/polyolefin compositions during extrusion which exhibit good low temperature toughness and impact strength and for which the processability and colorability is significantly improved via addition of one or more substantially random interpolymers of one or more α-olefin monomers with one or more vinyl or vinylidene aromatic monomers and/or one or more hindered aliphatic or cycloaliphatic vinyl or vinylidene monomers. Such blend compositions additionally find utility in many automotive interior parts, involving, for example, instrument panel, head impact and interior trim applications.

BRIEF SUMMARY OF THE INVENTION

The present invention relates to a blend of polymeric materials comprising;

(A) of from about 1 to about 80 percent by weight (based on the combined weights of Components A and B) of at least one substantially random interpolymer; wherein said interpolymer;
(1) contains of from about 0.5 to about 50 mole percent of polymer units derived from;
  a) at least one vinyl or vinylidene aromatic monomer, or
  b) at least one hindered aliphatic or cycloaliphatic vinyl or vinylidene monomer, or
  c) a combination of at least one vinyl or vinylidene aromatic monomer and at least one hindered aliphatic or cycloaliphatic vinyl or vinylidene monomer;
(2) contains of from about 50 to about 99.5 mole percent of polymer units derived from at least one aliphatic α-olefin having from 2 to 20 carbon atoms;
(3) has a melt index ($I_2$) of from about 0.01 to about 100 g/10 min; and
(4) has a molecular weight distribution ($M_w/M_n$) of from about 1.5 to about 20;
(B) of from about 20 to about 99 weight percent based on the combined weights of Components A, and B of one or more engineering thermoplastics.

The compositions of the present invention, can be utilized to produce a wide range of fabricated articles such as, for example, calendered, cast and blown sheets and films, extruded parts, blow molded parts, injection molded parts, and the like. The compositions of the present invention can further find utility in flexible molded goods, as layers in multilayer film structures, in applications such as automotive instrument panel skins.

DETAILED DESCRIPTION OF THE INVENTION

Definitions

All references herein to elements or metals belonging to a certain Group refer to the Periodic Table of the Elements published and copyrighted by CRC Press, Inc., 1989. Also any reference to the Group or Groups shall be to the Group or Groups as reflected in this Periodic Table of the Elements using the IUPAC system for numbering groups.

Any numerical values recited herein include all values from the lower value to the upper value in increments of one unit provided that there is a separation of at least 2 units between any lower value and any higher value. As an example, if it is stated that the amount of a component or a value of a process variable such as, for example, temperature, pressure, time and the like is, for example, from 1 to 90, preferably from 20 to 80, more preferably from 30 to 70, it is intended that values such as 15 to 85, 22 to 68, 43 to 51, 30 to 32 etc. are expressly enumerated in this specification. For values which are less than one, one unit is considered to be 0.0001, 0.001, 0.01 or 0.1 as appropriate. These are only examples of what is specifically intended and all possible combinations of numerical values between the lowest value and the highest value enumerated are to be considered to be expressly stated in this application in a similar manner.

The term "hydrocarbyl" as employed herein means any aliphatic, cycloaliphatic, aromatic, aryl substituted aliphatic, aryl substituted cycloaliphatic, aliphatic substituted aromatic, or aliphatic substituted cycloaliphatic groups.

The term "hydrocarbyloxy" means a hydrocarbyl group having an oxygen linkage between it and the carbon atom to which it is attached.

The term "interpolymer" is used herein to indicate a polymer wherein at least two different monomers are polymerized to make the interpolymer. This includes copolymers, terpolymers, etc.

The term "substantially random" in the substantially random interpolymer comprising an α-olefin and a vinyl or vinylidene aromatic monomer or hindered aliphatic or cycloaliphatic vinyl or vinylidene monomer as used herein means that the distribution of the monomers of said interpolymer can be described by the Bernoulli statistical model or by a first or second order Markovian statistical model, as described by J. C. Randall in *POLYMER SEQUENCE DETERMINATION Carbon-13 NMR Method*, Academic Press New York, 1977, pp. 71–78. Preferably, the substantially random interpolymer comprising an α-olefin and a vinyl or vinylidene aromatic monomer does not contain more than 15 percent of the total amount of vinyl or vinylidene aromatic monomer in blocks of vinyl or vinylidene aromatic monomer of more than 3 units. More preferably, the interpolymer was not characterized by a high degree of either isotacticity or syndiotacticity. This means that in the carbon$^{-13}$ NMR spectrum of the substantially random interpolymer the peak areas corresponding to the main chain methylene and methine carbons representing either meso diad sequences or racemic diad sequences should not exceed 75 percent of the total peak area of the main chain methylene and methine carbons.

The Substantially Random α-Olefin/Vinyl or Vinylidene Aromatic or Hindered Aliphatic Or Cycloaliphatic Vinyl or Vinylidene Interpolymer The substantially random interpolymers are prepared by polymerizing one or more α-olefins with one or more vinyl or vinylidene aromatic monomers and/or one or more hindered aliphatic or cycloaliphatic vinyl or vinylidene monomers, and optionally other polymerizable monomers.

Suitable α-olefins include for example, α-olefins containing from 2 to about 20, preferably from 2 to about 12, more preferably from 2 to about 8 carbon atoms. Particularly suitable are ethylene, propylene, butene-1, 4-methyl-1-pentene, hexene-1 and octene-1. These α-olefins do not contain an aromatic moiety.

Suitable vinyl or vinylidene aromatic monomers which can be employed to prepare the interpolymers include, for example, those represented by the following formula:

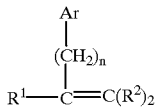

wherein $R^1$ is selected from the group of radicals consisting of hydrogen and alkyl radicals containing from 1 to about 4 carbon atoms, preferably hydrogen or methyl; each $R^2$ is independently selected from the group of radicals consisting of hydrogen and alkyl radicals containing from 1 to about 4 carbon atoms, preferably hydrogen or methyl; Ar is a phenyl group or a phenyl group substituted with from 1 to 5 substituents selected from the group consisting of halo, $C_{1-4}$-alkyl, and $C_{1-4}$-haloalkyl; and n has a value from zero to about 4, preferably from zero to 2, most preferably zero. Exemplary vinyl aromatic monomers include styrene, vinyl toluene, α-methylstyrene, t-butyl styrene, chlorostyrene, including all isomers of these compounds, and the like. Particularly suitable such monomers include styrene and lower alkyl- or halogen-substituted derivatives thereof Preferred monomers include styrene, α-methyl styrene, the lower alkyl- ($C_1$–$C_4$) or phenyl-ring substituted derivatives of styrene, such as for example, ortho-, meta-, and para-methylstyrene, the ring halogenated styrenes, para-vinyl toluene or mixtures thereof, and the like. A more preferred aromatic vinyl monomer is styrene.

By the term "hindered aliphatic or cycloaliphatic vinyl or vinylidene compounds", it is meant addition polymerizable vinyl or vinylidene monomers corresponding to the formula:

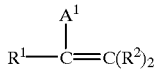

wherein $A^1$ is a sterically bulky, aliphatic or cycloaliphatic substituent of up to 20 carbons, $R^1$ is selected from the group of radicals consisting of hydrogen and alkyl radicals containing from 1 to about 4 carbon atoms, preferably hydrogen or methyl; each $R^2$ is independently selected from the group of radicals consisting of hydrogen and alkyl radicals containing from 1 to about 4 carbon atoms, preferably hydrogen or methyl; or alternatively $R^1$ and $A^1$ together form a ring system. By the term "sterically bulky" is meant that the monomer bearing this substituent is normally incapable of addition polymerization by standard Ziegler-Natta polymerization catalysts at a rate comparable with ethylene polymerizations. Preferred hindered aliphatic or cycloaliphatic vinyl or vinylidene compounds are monomers in which one of the carbon atoms bearing ethylenic unsaturation is tertiary or quaternary substituted. Examples of such substituents include cyclic aliphatic groups such as cyclohexyl, cyclohexenyl, cyclooctenyl, or ring alkyl or aryl substituted derivatives thereof, tert-butyl, norbornyl, and the like. Most preferred hindered aliphatic or cycloaliphatic vinyl or vinylidene compounds are the various isomeric vinyl- ring substituted derivatives of cyclohexene and substituted cyclohexenes, and 5-ethylidene-2-norbornene. Especially suitable are 1-, 3-, and 4-vinylcyclohexene. The linear α-olefins containing from 2 to about 20 carbon atoms such as ethylene, propylene, butene-1, 4-methyl-1-pentene, hexene-1 and octene-1 are not examples of hindered aliphatic or cycloaliphatic vinyl or vinylidene compounds.

Other optional polymerizable ethylenically unsaturated monomer(s) include strained ring olefins such as norbornene and $C_{1-10}$ alkyl or $C_{6-10}$ aryl substituted norbornenes, with an exemplary interpolymer being ethylene/styrene/norbornene.

The substantially random interpolymers may be modified by typical grafting, hydrogenation, functionalizing, or other reactions well known to those skilled in the art. The polymers may be readily sulfonated or chlorinated to provide functionalized derivatives according to established techniques.

One method of preparation of the substantially random interpolymers is by polymerization of a mixture of polymerizable monomers in the presence of metallocene or constrained geometry catalysts and an activating cocatalyst.

The substantially random interpolymers can be prepared as described in EP-A-0,416,815 by James C. Stevens et al. and U.S. Pat. No. 5,703,187 by Francis J. Timmers, both of which are incorporated herein by reference in their entirety. Preferred operating conditions for such polymerization reactions are pressures from atmospheric up to 3000 atmospheres and temperatures from −30° C. to 200° C. Polymerizations and unreacted monomer removal at temperatures above the autopolymerization temperature of the respective monomers may result in formation of some amounts of homopolymer polymerization products for example the production of atactic polystyrene.

Examples of suitable catalysts and methods for preparing the substantially random interpolymers are disclosed in U.S. application Ser. No. 702,475, filed May 20, 1991 (EP-A-514,828); as well as U.S. Pat. Nos. 5,055,438; 5,057,475; 5,096,867; 5,064,802; 5,132,380; 5,189,192; 5,321,106; 5,347,024; 5,350,723; 5,374,696; 5,399,635; 5,470,993; 5,703,187; and 5,721,185 all of which patents and applications are incorporated herein by reference.

The substantially random α-olefin/vinyl or vinylidene aromatic interpolymers can also be prepared by the methods described in JP 07/278230 employing compounds shown by the general formula

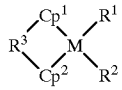

where $Cp^1$ and $Cp^2$ are cyclopentadienyl groups, indenyl groups, fluorenyl groups, or substituents of these, independently of each other; $R^1$ and $R^2$ are hydrogen atoms, halogen atoms, hydrocarbon groups with carbon numbers of 1–12, alkoxy groups, or aryloxy groups, independently of each other; M is a group IV metal, preferably Zr or Hf, most preferably Zr; and $R^3$ is an alkylene group or silanediyl group used to cross-link $Cp^1$ and $Cp^2$.

The substantially random α-olefin/vinyl or vinylidene aromatic interpolymers can also be prepared by the methods described by John G. Bradfute et al. (W. R. Grace & Co.) in WO 95/32095; by R. B. Pannell (Exxon Chemical Patents, Inc.) in WO 94/00500; and in Plastics Technology, p. 25 (September 1992), all of which are incorporated herein by reference in their entirety.

Also suitable are the substantially random interpolymers which comprise at least one α-olefin/vinyl aromatic/vinyl aromatic/α-olefin tetrad disclosed in U.S. application Ser. No. 08/708,809 filed Sep. 4, 1996 and WO 98/09999 both by Francis J. Timmers et al. These interpolymers contain additional signals in their carbon-13 NMR spectra with intensities greater than three times the peak to peak noise. These signals appear in the chemical shift range 43.70–44.25 ppm and 38.0–38.5 ppm. Specifically, major peaks are observed at 44.1, 43.9 and 38.2 ppm. A proton test NMR experiment indicates that the signals in the chemical shift region 43.70–44.25 ppm are methine carbons and the signals in the region 38.0–38.5 ppm are methylene carbons.

It is believed that these new signals are due to sequences involving two head-to-tail vinyl aromatic monomer insertions preceded and followed by at least one α-olefin insertion, e.g. an ethylene/styrene/styrene/ethylene tetrad wherein the styrene monomer insertions of said tetrads occur exclusively in a 1,2 (head to tail) manner. It is understood by one skilled in the art that for such tetrads involving a vinyl aromatic monomer other than styrene and an α-olefin other than ethylene that the ethylene/vinyl aromatic monomer/ vinyl aromatic monomer/ethylene tetrad will give rise to similar carbon-13 NMR peaks but with slightly different chemical shifts.

These interpolymers are prepared by conducting the polymerization at temperatures of from about −30° C. to about 250° C. in the presence of such catalysts as those represented by the formula

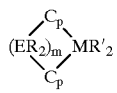

wherein: each Cp is independently, each occurrence, a substituted cyclopentadienyl group π-bound to M; E is C or Si; M is a group IV metal, preferably Zr or Hf, most preferably Zr; each R is independently, each occurrence, H, hydrocarbyl, silahydrocarbyl, or hydrocarbylsilyl, containing up to about 30 preferably from 1 to about 20 more preferably from 1 to about 10 carbon or silicon atoms; each R' is independently, each occurrence, H, halo, hydrocarbyl, hydrocarbyloxy, silahydrocarbyl, hydrocarbylsilyl containing up to about 30 preferably from 1 to about 20 more preferably from 1 to about 10 carbon or silicon atoms or two R' groups together can be a $C_{1-10}$ hydrocarbyl substituted 1,3-butadiene; m is 1 or 2; and optionally, but preferably in the presence of an activating cocatalyst. Particularly, suitable substituted cyclopentadienyl groups include those illustrated by the formula:

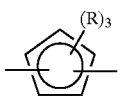

wherein each R is independently, each occurrence, H, hydrocarbyl, silahydrocarbyl, or hydrocarbylsilyl, containing up to about 30 preferably from 1 to about 20 more preferably from 1 to about 10 carbon or silicon atoms or two R groups together form a divalent derivative of such group. Preferably, R independently each occurrence is (including where appropriate all isomers) hydrogen, methyl, ethyl, propyl, butyl, pentyl, hexyl, benzyl, phenyl or silyl or (where appropriate) two such R groups are linked together forming a fused ring system such as indenyl, fluorenyl, tetrahydroindenyl, tetrahydrofluorenyl, or octahydrofluorenyl.

Particularly preferred catalysts include, for example, racemic-(dimethylsilanediyl-bis-(2-methyl-4-phenylindenyl))zirconium dichloride, racemic-(dimethylsilanediyl-bis-(2-methyl-4-phenylindenyl)) zirconium 1,4-diphenyl-1,3-butadiene, racemic-(dimethylsilanediyl-bis-(2-methyl-4-phenylindenyl)) zirconium di-$C_{1-4}$ alkyl, racemic-(dimethylsilanediyl-bis-(2-methyl-4-phenylindenyl))zirconium di-$C_{1-4}$ alkoxide.

Also included are the titanium-based constrained geometry catalysts, [N-(1,1-dimethylethyl)- 1,1-dimethyl-1-[(1,2,3,4, 5-η)-1,5,6,7-tetrahydro-s-indacen-1-yl]silanaminato (2-)-N]titanium dimethyl; (1-indenyl)(tert-butylamido) dimethyl-silane titanium dimethyl; ((3-tert-butyl)(1,2,3,4,5-η)-1-indenyl)(tert-butylamido) dimethylsilane titanium dimethyl; and ((3-iso-propyl)(1,2,3,4,5-η)-1-indenyl)(tert-butyl amido) dimethylsilane titanium dimethyl, or any combination thereof and the like.

Further preparative methods for the substantially random α-olefin/vinyl or vinylidene aromatic interpolymers blend components of the present invention have been described in the literature. Longo and Grassi (*Makromol. Chem.*, Volume 191, pages 2387 to 2396 [1990]) and D'Anniello et al. (Journal of Applied Polymer Science, Volume 58, pages 1701–1706 [1995]) reported the use of a catalytic system based on methylalumoxane (MAO) and cyclopentadienyltitanium trichloride ($CpTiCl_3$) to prepare an ethylene-styrene copolymer. Xu and Lin (*Polymer Preprints, Am. Chem. Soc., Div. Polym. Chem.*) Volume 35, pages 686, 687 [1994]) have reported copolymerization using a $MgCl_2/TiCl_4/NdCl_3/Al$ $(iBu)_3$ catalyst to give random copolymers of styrene and propylene. Lu et al (*Journal of Applied Polymer Science*, Volume 53, pages 1453 to 1460 [1994]) have described the copolymerization of ethylene and styrene using a $TiCl_4/NdCl_3/MgCl_2/Al(Et)_3$ catalyst. The manufacture of α-olefin/vinyl aromatic monomer interpolymers such as propylene/styrene and butene/styrene are described in U.S. Pat. No. 5,244,996, issued to Mitsui Petrochemical Industries Ltd or U.S. Pat. No. 5,652,315 also issued to Mitsui Petrochemical Industries Ltd or as disclosed in DE 197 11 339 A1 to Denki KAGAKU Kogyo KK. All the above methods disclosed for preparing the interpolymer component are incorporated herein by reference.

While preparing the substantially random interpolymer, an amount of atactic vinyl or vinylidene aromatic homopolymer may be formed due to homopolymerization of the vinyl or vinylidene aromatic monomer at elevated temperatures. The presence of vinyl or vinylidene aromatic homopolymer is in general not detrimental for the purposes of the present invention and can be tolerated. The vinyl or vinylidene aromatic homopolymer may be separated from the interpolymer, if desired, by extraction techniques such as selective precipitation from solution with a non solvent for either the interpolymer or the vinyl or vinylidene aromatic homopolymer. For the purpose of the present invention it is preferred that no more than 20 weight percent, preferably less than 15 weight percent based on the total weight of the interpolymers of atactic vinyl or vinylidene aromatic homopolymer is present.

Also included as interpolymer blend components are $C_4$–$C_7$, isoolefin/para-alkylstyrene interpolymers which are random copolymers of a $C_4$ to $C_7$ isomonoolefin, such as isobutylene and a para-alkylstyrene comonomer, preferably para-methylstyrene containing at least about 80%, more preferably at least about 90% by weight of the para isomer. These interpolymers also include functionalized interpolymers wherein at least some of the alkyl substituent groups present in the styrene monomer units contain halogen or some other functional group incorporated by nucleophilic substitution of benzylic halogen with other groups such as alkoxide, phenoxide, carboxylate, thiolate, thioether, thiocarbamate, dithiocarbamate, thiourea, xanthate, cyanide, malonate, amine, amide, carbazole, phthalamide, maleimide, cyanate, and mixtures thereof Preferred materials may be characterized as isobutylene interpolymers containing the following monomer units randomly spaced along the polymer chain. These functionalized isomonoolefin interpolymers and their method of preparation are more particularly disclosed in U.S. Pat. No. 5,162,445, the complete disclosure of which is incorporated herein by reference.

Most useful of such functionalized materials are elastomeric, random interpolymers of isobutylene and para-methylstyrene containing from about 0.5 to about 20 mole % para-methylstyrene wherein up to about 60 mole % of the methyl substituent groups present on the benzyl ring contain a bromine or chlorine atom, preferably a bromine atom. These polymers have a substantially homogeneous compositional distribution such that at least 95% by weight of the polymer has a para-alkylstyrene content within 10% of the average para-alkylstyrene content of the polymer. More preferred polymers are also characterized by a narrow molecular weight distribution ($M_w/M_n$) of less than about 5, more preferably less than about 2.5. a preferred viscosity average molecular weight in the range of from about 200,000 up to about 2,000,000, and a preferred number average molecular weight in the range of from about 25,000 to about 750,000, as determined by Gel Permeation Chromatography.

The interpolymers may be prepared by slurry polymerization of the monomer mixture using a Lewis Acid catalyst followed by halogenation, preferably bromination, in solution in the presence of halogen and a radical initiator such as heat and/or light and/or a chemical initiator.

Preferred interpolymers are brominated interpolymers which generally contain from about 0.1 to about 5 mole % of bromomethylgroups, most of which is monobromomethyl, with less than 0.05 mole % dibromomethyl substituents present in the copolymer. More preferred interpolymers contain from about 0.05 up to about 2.5 wt % of bromine based on the weight of the interpolymer, most preferably from about 0.05 to 0.75 wt % bromine, and are substantially free of ring halogen or halogen in the polymer backbone chain. These interpolymers, their method of preparation, their method of cure and graft or functionalized polymers derived therefrom are more particularly disclosed in the above referenced U.S. Pat. No. 5,162,445. Such interpolymers are commercially available from Exxon Chemical under the tradename Exxpro™ Speciality Elastomers.

The Engineering Thermoplastic

The terms "engineering plastics" and "engineering thermoplastics", can be used interchangeably. Engineering Thermoplastics include acetal and acrylic resins (e.g polymethylmethacrylate, PMMA), polyamides (e.g. nylon-6, nylon 6,6,), polyimides, polyetherimides, cellulosics, polyesters, poly(arylate), aromatic polyesters, poly(carbonate), poly(butylene) and polybutylene and polyethylene terephthalates. liquid crystal polymers, and selected polyolefins, blends, or alloys of the foregoing resins, and some examples from other resin types (including e.g. polyethers) high temperature polyolefins such as polycyclopentanes, its copolymers, and polymethylpentane.). Of these especially preferred are poly(carbonate), polymethylmethacrylate and the polybutylene and polyethylene terephthalates.

a) Polycarbonates useful as the blending or molding polymer can be prepared from a dihydroxy compound such as a bisphenol, and a carbonate precursor such as a disubstituted carbonic acid derivative, a haloformate (such as a bishaloformate of a glycol or dihydroxy benzene), or a carbonate ester such as diphenyl carbonate or a substituted derivative thereof. These components are often reacted by means of the phase boundary process in which the dihydroxy compound is dissolved and deprotonated in an aqueous alkaline solution to form bisphenolate and the carbonate precursor is dissolved in an organic solvent.

These components are often reacted by means of a mixture prepared initially from the aromatic dihydroxy compound, water and a non-reactive organic solvent immiscible with water selected from among those in which the carbonate precursor and polycarbonate product are soluble. Representative solvents include chlorinated hydrocarbons such as methylene chloride, 1,2-dichloroethane, tetrachloroethane, chlorobenzene, and chloroform. Caustic soda or other base is then added to the reaction mixture to adjust the pH of the mixture to a level at which the dihydroxy compound is activated to dianionic form.

A carbonate precursor is contacted with an agitated mixture of the aqueous alkaline solution of the dihydroxy compound, and, for such purpose, the carbonate precursor can be bubbled into the reaction mixture in the form of a gas, or can be dissolved and introduced in solution form. Carbonater precursor is typically used in an amount of about 1.0 to 1.8, preferably about 1.2. to 1.5, moles per mole of dihydroxy compound. The mixture is agitated in a manner which is sufficient to disperse or suspend droplets of the solvent containing the carbonate precursor in the aqueous alkaline solution. Reaction between the organic and aqueous phases created by such agitation yields the bis(carbonate precursor) ester of the dihydroxy compound. For example, if the carbonate precursor is a carbonyl halide such as phosgene, the products of this initial phase of the process are monomers or oligomers which are either mono- or dichloroformates, or contain a phenolate ion at each terminus.

These intermediate mono- and oligocarbonates dissolve in the organic solvent as they form, and they can then be condensed to a higher molecular weight polycarbonate by contact with a coupling catalyst of which the following are representative: a tertiary amine such as triethyl amine and dimethyl amino pyridine.

Upon completion of polymerization, the organic and aqueous phases are separated to allow purification of the organic phase and recovery of the polycarbonate product therefrom. The organic phase is washed as needed in a centrifuge with dilute base, water and/or dilute acid until free of unreacted monomer, residual process chemicals and/or other electrolytes. Recovery of the polycarbonate product can be effected by spray drying, steam devolatilization, direct devolatilization in a vented extruder, or precipitation by use of an anti-solvent such as toluene, cyclohexane, heptane, methanol, hexanol, or methyl ethyl ketone.

In the melt process for preparation of polycarbonate, aromatic diesters of carbonic acid are condensed with an aromatic dihydroxy compound in a transesterification reaction in the presence of a basic catalyst. The reaction is typically run at about 250° C. to 300° C. under vacuum at a progressively reduced pressure of about 1 to 100 mm Hg.

Polycarbonate can also be prepared in a homogeneous solution through a process in which a carbonate precursor, such as phosgene, is contacted with a solution containing an aromatic dihydroxy compound, a chlorinated hydrocarbon solvent and a substance, such as pyridine, for dimethyl aniline or Ca(OH)$_2$, which acts as both acid acceptor and condensation catalyst.

Examples of some dihydroxy compounds suitable for the preparation of polycarbonate include variously bridged, substituted or unsubstituted aromatic dihydroxy compounds (or mixtures thereof) represented by the formula:

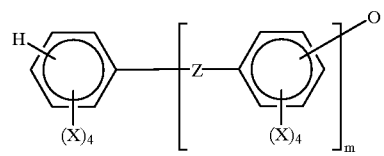

wherein:
I) Z is (A) a divalent radical, of which all or different portions can be (i) linear, branched, cyclic or bicyclic, (ii) aliphatic or aromatic, and/or (iii) saturated or unsaturated, said divalent radical being composed of 1–35 carbon atoms together with up to five oxygen, nitrogen, sulfur, phosphorous and/or halogen (such as fluorine, chlorine and/or bromine) atoms; or (B) S, S$_2$, SO, S$_2$, O or CO; or (C) a single bond;
II) each X is independently hydrogen, a halogen (such as fluorine, chlorine and/or bromine), a C$_1$–C$_2$, preferably C$_1$–C$_8$, linear or cyclic alkyl, aryl, alkaryl, aralkyl, alkoxy or aryloxy radical, such as methyl, ethyl, isopropyl, cyclopentyl, cyclohexyl, methoxy, ethoxy, benzyl, tolyl, xylyl, phenoxy and/or xylynoxy; or a nitro or nitrile radical; and
(III) m is 0 or 1.

For example, the bridging radical represented by Z in the above formula can be a $C_{2-C30}$ alkyl, cycloalkyl, alkylidene or cycloalkyidene radical, or two or more thereof connected by an aromatic or ether linkage, or can be a carbon atom to which is bonded one or more groups such as $CH_3$, $C_2H_5$, $C_3H_7$, n-$C_3H_7$, i-$C_3H_7$, cyclohexyl, bicyclo[2.2.]heptyl, benzyl, $CF_2$, $CF_3$ $CCl_3$, $CF_2Cl$, CN, $(CH_2)_2COOCH_3$, or $PO(OCH_3)_2$.

Representative examples of dihydroxy compounds of particular interest are the bis(hydroxyphenyl)alkanes, the bis(hydroxyphenyl)cycloalkanes, the dihydroxydiphenyls and the bis(hydroxyphenyl)sulfones, and in particular are 2,2-bis(4-hydroxyphenyl)propane ("Bisphenol-A" or "Bis-A"); 2,2-bis(3,5-dihalo-4-hydroxyphenyl)propane ("Tetrahalo Bisphenol-A") where the halogen can be fluorine, chlorine, bromine or iodine, for example 2,2-bis(3,5-dibromo-4-hydroxyphenyl)propane ("Tetrabromo Bisphenol-A" or "TBBA"); 2,2-bis(3,5-dialkyl-4-hydroxyphenyl)propane ("Tetraalkyl Bisphenol-A") where the alkyl can be methyl or ethyl, for example 2,2-bis(3,5-dimethyl-4-hydroxyphenyl)propane ("Tetramethyl Bisphenol-A"); 1,1-bis(4-hydroxyphenyl)-1-phenyl ethane ("Bisphenol-AP" or "Bis-AP"); Bishydroxy phenyl fluorene; and 1,1-bis(4-hydroxyphenyl)cyclohexane.

Using a process such as is generally described above, a polycarbonate product can be obtained having a weight average molecular weight, as determined by light scattering or gel permeation chromatography, of 8,000 to 200,000 and preferably 15,000 to 40,000, and/or a melt flow value of about 3 to 150, preferably about 10 to 80 (as determined by ASTM Designation D 1238-89, Condition 300/1.2), although values outside these ranges are permitted as well. Molecular weight can be controlled by addition to the reaction mixture of a chain terminator which may be selected from monofunctional substances such as phenols, carbonic acid chlorides, or phenylchlorocarbonates.

A branched rather than linear polycarbonate molecule can be obtained by adding to the reaction mixture a tri- or polyfunctional monomer such as trisphenoxy ethane.

The preferred process of this invention is that in which an aromatic polycarbonate is prepared. An aromatic polycarbonate is defined herein with reference to the oxygen atoms, of the one or more dihydroxy compounds present in the polycarbonate chain, which are bonded to a carbonyl carbon of the carbonate precursor. In an aromatic polycarbonate, all such oxygen atoms are bridged by a dihydroxy compound residue some portion of which is an aromatic ring.

Also included within the term "polycarbonate", as used herein, are various copolycarbonates, certain of which can be prepared by incorporating one or more different dihydroxy compounds into the reaction mixture. When a dicarboxylic acid such terephthalic acid or isophthalic acid (or an ester-forming derivative thereof) or a hydroxycarboxylic acid is used in the reaction mixture, or to form an oligomeric prepolymer, instead of one of the "different" dihydroxy compounds mentioned above, a poly(ester/carbonate) is obtained, which is discussed in greater detail in Swart, U.S. Pat. No. 4,105,533. In a preferred embodiment, the compositions of this invention exclude a poly(ester/carbonate).

Copolycarbonates can also be prepared, for example, by reaction of one or more dihydroxy compounds with a carbonate precursor in the presence of a chlorine- or amino-terminated polysiloxane, with a hydroxy-terminated poly(phenylene oxide) or poly(methyl methacrylate), or with phosphonyl dichloride or an aromatic ester of a phosphonic acid. Siloxane/carbonate block terpolymers are discussed in greater detail in Paul, U.S. Pat. No. 4,596,970.

The methods generally described above for preparing carbonate polymers suitable for use in the practice of this invention are well known; for example, several methods are discussed in detail in Schnell, U.S. Pat. No. 3,028,365; Glass, U.S. Pat. No. 4,529,791; and Grigo, U.S. Pat. No. 4,677,162.

b) Polyesters may be made by the self-esterification of hydroxycarboxylic acids, or by direct esterification, which involves the step-growth reaction of a diol with a dicarboxylic acid with the resulting elimination of water, giving a polyester with an -[-AABB-]- repeating unit. The reaction may be run in bulk or in solution using an inert high boiling solvent such as xylene or chlorobenzene with azeotropic removal of water.

Alternatively, but in like manner, ester-forming derivatives of a dicarboxylic acid can be heated with a diol to obtain polyesters in an ester interchange reaction. Suitable acid derivatives for such purpose are alkyl esters, halides, salts or anhydrides of the acid. Preparation of polyarylates, from a bisphenol and an aromatic diacid, can be conducted in an interfacial system which is essentially the same as that used for the preparation of polycarbonate.

Polyesters can also be produced by a ring-opening reaction of cyclic esters or $C_{4-C7}$ lactones, for which organic tertiary amine bases phosphines and alkali and alkaline earth metals, hydrides and alkoxides can be used as initiators.

Suitable reactants for making the polyester used in this invention, in addition to hydroxycarboxylic acids, are diols and dicarboxylic acids either or both of which can be aliphatic or aromatic. A polyester which is a poly(alkylene alkanedicarboxylate), a poly(alkylene arylenedicarboxylate), a poly(arylene alkanedicarboxylate), or a poly(arylene arylenedicarboxylate) is therefore appropriate for use herein. Alkyl portions of the polymer chain can be substituted with, for example, halogens, $C_1-C_8$ alkoxy groups or $C_1-C_8$ alkyl side chains and can contain divalent heteroatomic groups (such as —O—, —Si—, —S— or —$SO_2$—) in the paraffinic segment of the chain. The chain can also contain unsaturation and $C_{6-C10}$ non-aromatic rings. Aromatic rings can contain substituents such as halogens, $C_1-C_8$ alkoxy or $C_1-C_8$ alkyl groups, and can be joined to the polymer backbone in any ring position and directly to the alcohol or acid functionality or to intervening atoms.

Typical aliphatic diols used in ester formation are the $C_{2-C10}$ primary and secondary glycols, such as ethylene-, propylene-, and butylene glycol. Alkanedicarboxylic acids frequently used are oxalic acid, adipic acid and sebacic acid. Diols which contain rings can be, for example, a 1,4-cyclohexylenyl glycol or a 1,4-cyclohexane-dimethylene glycol, resorcinol, hydroquinone, 4,4'-thiodiphenol, bis-(4-hydroxyphenyl)sulfone, a dihydroxynaphthalene, a xylylene diol, or can be one of the many bisphenols such as 2,2-bis-(4-hydroxyphenyl)propane. Aromatic diacids include, for example, terephthalic acid, isophthalic acid, naphthalenedicarboxylic acid, diphenyletherdicarboxylic acid, diphenyldicarboxylic acid, diphenylsulfonedicarboxylic acid, diphenoxyethanedicarboxylic acid.

In addition to polyesters formed from one diol and one diacid only, the term "polyester" as used herein includes random, patterned or block copolyesters, for example those formed from two or more different diols and/or two or more different diacids, and/or from other divalent heteroatomic groups. Mixtures of such copolyesters, mixtures of polyesters derived from one diol and diacid only, and mixtures of members from both of such groups, are also all suitable for use in this invention, and are all included in the term "polyester". For example, use of cyclohexanedimethanol together with ethylene glycol in esterification with terephthalic acid forms a clear, amorphous copolyester of particular interest. Also contemplated are liquid crystalline polyesters derived from mixtures of 4-hydroxybenzoic acid and 2-hydroxy-6-naphthoic acid; or mixtures of terephthalic acid, 4-hydroxybenzoic acid and ethylene glycol; or mixtures of terephthalic acid, 4-hydroxybenzoic acid and 4,4'-dihydroxybiphenyl.

Aromatic polyesters, those prepared from an aromatic diacid, such as the poly(alkylene arylenedicarboxylates) polyethylene terephthalate and polybutylene terephthalate, or mixtures thereof, are particularly useful in this invention. A polyester suitable for use herein may have an intrinsic viscosity of about 0.4 to 1.2, although values outside this range are permitted as well.

Methods and materials useful for the production of polyesters, as described above, are discussed in greater detail in Whinfield, U.S. Pat. No. 2,465,319, Pengilly, U.S. Pat. No. 3,047,539, Schwarz, U.S. Pat. No. 3,374,402, Russell, U.S. Pat. No. 3,756,986 and East, U.S. Pat. No. 4,393,191.

Most acrylic resins derive from the peroxide-catalyzed free radical polymerization of methyl methacrylate (MMA) to make polymethylmethacrylate (PMMA). As described by H. Luke in Modern Plastics Encyclopedia, 1989, pps 20–21, MMA is usually copolymerized with other acrylates such as methyl- or ethyl acrylate using four basic polymerization processes, bulk, suspension, emulsion and solution. Acrylics can also be modified with various ingredients including styrene, butadiene, vinyl and alkyl acrylates. Acrylics known as PMMA have ASTM grades and specifications. Grades 5, 6 and 8 vary mainly in deflection temperature under load (DTL) requirements. Grade 8 requires a tensile strength of 9,000 psi vs 8,000 psi for Grades 5 and 6. The DTL varies from a minimum requirement of 153° F. to a maximum of 189° F., under a load of 264 p.s.i. Certain grades have a DTL of 212° F. Impact-modified grades range from an Izod impact of 1.1 to 2.0 ft lb/in for non-weatherable transparent materials. The opaque impact-modified grades can have Izod impact values as high as 5.0 ft lb/in.

The Polyolefin Elastomers

The polyolefin elastomer component of the blend can include, but is not limited to one or more of the α-olefin homopolymers and interpolymers comprising polypropylene, propylene/$C_4$–$C_{20}$ α-olefin copolymers, polyethylene, and ethylene/$C_3$–$C_{20}$ α-olefin copolymers, the interpolymers can be either heterogeneous ethylene/α-olefin interpolymers or homogeneous ethylene/α-olefin interpolymers, including the substantially linear ethylene/α-olefin interpolymers.

Homogeneous Ethylene/α-Olefin Interpolymers

The relatively recent introduction of metallocene-based catalysts for ethylene/α-olefin polymerization has resulted in the production of new ethylene interpolymers and new requirements for compositions containing these materials. Such polymers are known as homogeneous interpolymers and are characterized by their narrower molecular weight and composition distributions (defined as the weight percent of the polymer molecules having a comonomer content within 50 percent of the median total molar comonomer content) relative to, for example, traditional Ziegler catalyzed heterogeneous polyolefin polymers. Generally blown and cast film made with such polymers are tougher and have better optical properties and heat sealability than film made with Ziegler Natta catalyzed LLDPE. It is known that metallocene LLDPE offers significant advantages over Ziegler Natta produced LLDPE's in cast film for pallet wrap applications, particularly improved on-pallet puncture resistance. Such metallocene LLDPE's however have a significantly poorer processability on the extruder than Ziegler Natta products.

The Substantially Linear Ethylene/α-Olefin Polymers

The substantially linear ethylene/α-olefin polymers and interpolymers of the present invention are herein defined as in U.S. Pat. No. 5,272,236 and in U.S. Pat. No. 5,278,272 (Lai et al.), the entire contents of which are incorporated by reference. The substantially linear ethylene/α-olefin polymers are also metallocene based homogeneous polymers, as the comonomer is randomly distributed within a given interpolymer molecule and wherein substantially all of the interpolymer molecules have the same ethylene/comonomer ratio within that interpolymer. Such polymers are unique however due to their excellent processability and unique rheological properties and high melt elasticity and resistance to melt fracture. These polymers can be successfully prepared in a continuous polymerization process using the constrained geometry metallocene catalyst systems.

The substantially linear ethylene/α-olefin polymers and are those in which the comonomer is randomly distributed within a given interpolymer molecule and wherein substantially all of the interpolymer molecules have the same ethylene/comonomer ratio within that interpolymer.

The term "substantially linear" ethylene/α-olefin interpolymer means that the polymer backbone is substituted with about 0.01 long chain branches/1000 carbons to about 3 long chain branches/1000 carbons, more preferably from about 0.01 long chain branches/1000 carbons to about 1 long chain branches/1000 carbons, and especially from about 0.05 long chain branches/1000 carbons to about 1 long chain branches/1000 carbons.

Long chain branching is defined herein as a chain length of at least one carbon more than two carbons less than the total number of carbons in the comonomer, for example, the long chain branch of an ethylene/octene substantially linear ethylene interpolymer is at least seven (7) carbons in length (i.e., 8 carbons less 2 equals 6 carbons plus one equals seven carbons long chain branch length). The long chain branch can be as long as about the same length as the length of the polymer back-bone. Long chain branching is determined by using $^{13}C$ nuclear magnetic resonance (NMR) spectroscopy and is quantified using the method of Randall (*Rev. Macromol. Chem. Phys.*, C29 (2&3), p. 285–297), the disclosure of which is incorporated herein by reference. Long chain branching, of course, is to be distinguished from short chain branches which result solely from incorporation of the comonomer, so for example the short chain branch of an ethylene/octene substantially linear polymer is six carbons in length, while the long chain branch for that same polymer is at least seven carbons in length.

The "rheological processing index" (PI) is the apparent viscosity (in kpoise) of a polymer measured by a gas extrusion rheometer (GER). The gas extrusion rheometer is described by M. Shida, R. N. Shroff and L. V. Cancio in *Polymer Engineering Science*, Vol. 17, no. 11, p. 770 (1977), and in "Rheometers for Molten Plastics" by John Dealy, published by Van Nostrand Reinhold Co. (1982) on page 97–99, both publications of which are incorporated by reference herein in their entirety. All GER experiments are performed at a temperature of 190° C., at nitrogen pressures between 5250 to 500 psig using a 0.0296 inch diameter, 20:1 L/D die with an entrance angle of 180°. For the substantially linear ethylene/α-olefin polymers described herein, the PI is the apparent viscosity (in kpoise) of a material measured by GER at an apparent shear stress of $2.15 \times 10^6$ dyne/cm$^2$. The novel substantially linear ethylene/α-olefin interpolymers described herein preferably have a PI in the range of about 0.01 kpoise to about 50 kpoise, preferably about 15 kpoise or less. The novel substantially linear ethylene/α-olefin polymers described herein have a PI less than or equal to about 70 percent of the PI of a comparative linear ethylene/α-olefin polymer at about the same $I_2$ and $M_w/M_n$.

An apparent shear stress vs. apparent shear rate plot is used to identify the melt fracture phenomena. According to Ramamurthy in *Journal of Rheology*, 30(2), 337–357, 1986, above a certain critical flow rate, the observed extrudate irregularities may be broadly classified into two main types: surface melt fracture and gross melt fracture.

Surface melt fracture occurs under apparently steady flow conditions and ranges in detail from loss of specular gloss to the more severe form of "sharkskin". In this disclosure, the onset of surface melt fracture (OSMF) is characterized at the beginning of losing extrudate gloss at which the surface roughness of extrudate can only be detected by 40× magnification. The critical shear rate at onset of surface melt fracture for the substantially linear ethylene/α-olefin interpolymers is at least 50 percent greater than the critical shear rate at the onset of surface melt fracture of a linear ethylene/α-olefin polymer having about the same $I_2$ and $M_w/M_n$, wherein "about the same" as used herein means that each value is within 10 percent of the comparative value of the comparative linear ethylene polymer.

Gross melt fracture occurs at unsteady flow conditions and ranges in detail from regular (alternating rough and smooth, helical, etc.) to random distortions. For commercial acceptability, (e.g., in blown film products), surface defects should be minimal, if not absent. The critical shear rate at onset of surface melt fracture (OSMF) and onset of gross melt fracture (OGMF) will be used herein based on the changes of surface roughness and configurations of the extrudates extruded by a GER.

The substantially linear ethylene/α-olefin polymers useful for forming the compositions described herein have homogeneous branching distributions. That is, the polymers are those in which the comonomer is randomly distributed within a given interpolymer molecule and wherein substantially all of the interpolymer molecules have the same ethylene/comonomer ratio within that interpolymer. The homogeneity of the polymers is typically described by the SCBDI (Short Chain Branch Distribution Index) or CDBI (Composition Distribution Branch Index) and is defined as the weight percent of the polymer molecules having a comonomer content within 50 percent of the median total molar comonomer content. The CDBI of a polymer is readily calculated from data obtained from techniques known in the art, such as, for example, temperature rising elution fractionation (abbreviated herein as "TREF") as described, for example, in Wild et al, *Journal of Polymer Science, Pol. Phys. Ed.*, Vol. 20, p. 441 (1982), in U.S. Pat. No. 4,798,081 (Hazlitt et al.), or as is described in U.S. Pat. No. 5,008,204 (Stehling), the disclosure of which is incorporated herein by reference. The technique for calculating CDBI is described in U.S. Pat. No. 5,322,728 (Davey et al.) and in U.S. Pat. No. 5,246,783 (Spenadel et al.). or in U.S. Pat. No. 5,089,321 (Chum et al.) the disclosures of all of which are incorporated herein by reference. The SCBDI or CDBI for the substantially linear olefin interpolymers used in the present invention is preferably greater than about 30 percent, especially greater than about 50 percent. The substantially linear ethylene/α-olefin interpolymers used in this invention essentially lack a measurable "high density" fraction as measured by the TREF technique (i.e., the homogeneous ethylene/α-olefin interpolymers do not contain a polymer fraction with a degree of branching less than or equal to 2 methyls/1000 carbons). The substantially linear ethylene/α-olefin polymers also do not contain any highly short chain branched fraction (i.e., they do not contain a polymer fraction with a degree of branching equal to or more than 30 methyls/1000 carbons).

The catalysts used to prepare the homogeneous interpolymers for use as blend components in the present invention are metallocene catalysts. These metallocene catalysts include the bis(cyclopentadienyl)-catalyst systems and the mono(cyclopentadienyl) Constrained Geometry catalyst systems (used to prepare the substantially linear ethylene/α-olefin polymers). Such constrained geometry metal complexes and methods for their preparation are disclosed in U.S. application Ser. No. 545,403, filed Jul. 3, 1990 (EP-A-416,815); as well as U.S. Pat. Nos. 5,721,185; 5,374,696; 5,470,993, 5,055,438, 5,057,475, 5,096,867, 5,064,802, and 5,132,380.

In EP-A 418,044, published Mar. 20, 1991 (equivalent to U.S. Ser. No. 07/758,654) certain cationic derivatives of the foregoing constrained geometry catalysts that are highly useful as olefin polymerization catalysts are disclosed and claimed. In U.S. Pat. No. 5,453,410 combinations of cationic constrained geometry catalysts with an alumoxane were disclosed as suitable olefin polymerization catalysts. For the teachings contained therein, the aforementioned pending United States Patent applications, issued United States Patents and published European Patent Applications are herein incorporated in their entirety by reference thereto.

2) Heterogeneous Ethylene/α-Olefin Interpolymers

Heterogeneous interpolymers are differentiated from the homogeneous interpolymers in that in the latter, substantially all of the interpolymer molecules have the same ethylene/comonomer ratio within that interpolymer, whereas heterogeneous interpolymers are those in which the interpolymer molecules do not have the same ethylene/comonomer ratio. The term "broad composition distribution" used herein describes the comonomer distribution for heterogeneous interpolymers and means that the heterogeneous interpolymers have a "linear" fraction and that the heterogeneous interpolymers have multiple melting peaks (i.e., exhibit at least two distinct melting peaks) by DSC. The heterogeneous interpolymers have a degree of branching less than or equal to 2 methyls/1000 carbons in about 10 percent (by weight) or more, preferably more than about 15 percent (by weight), and especially more than about 20 percent (by weight). The heterogeneous interpolymers also have a degree of branching equal to or greater than 25 methyls/1000 carbons in about 25 percent or less (by weight), preferably less than about 15 percent (by weight), and especially less than about 10 percent (by weight).

The Ziegler catalysts suitable for the preparation of the heterogeneous component of the current invention are typical supported, Ziegler-type catalysts which are particularly useful at the high polymerization temperatures of the solution process. Examples of such compositions are those derived from organomagnesium compounds, alkyl halides or aluminum halides or hydrogen chloride, and a transition metal compound. Examples of such catalysts are described in U.S. Pat. No. 4,314,912 (Lowery, Jr. et al.), U.S. Pat. No. 4,547,475 (Glass et al.), and U.S. Pat. No. 4,612,300 (Coleman, III), the teachings of which are incorporated herein by reference.

Suitable catalyst materials may also be derived from a inert oxide supports and transition metal compounds. Examples of such compositions suitable for use in the solution polymerization process are described in U.S. Pat. No. 5,420,090 (Spencer. et al.), the teachings of which are incorporated herein by reference.

The heterogeneous polymer component can be an α-olefin homopolymer referably polyethylene or polypropylene, or, preferably, an interpolymer of ethylene with at least one $C_3$–$C_{20}$ α-olefin and/or $C_4$–$C_{18}$ diolefins. Heterogeneous copolymers of ethylene and 1-octene are especially preferred.

The Functional Polyolefins

Functional polyolefins are olefin interpolymers other than those of the polyolefin elastomer and substantially random interpolymer blend components described above. They typically comprise interpolymers of an alpha olefin with one or more ethylenically unsaturated monomers, of which the following are exemplary: a C1–C8 vinyl compound such as vinyl acetate or; a C1–C8 alkyl acrylate such as methyl acrylate, ethyl acrylate or hexyl acryl ate; a C1–C8 alkyl methacrylate such as methyl methacrylate or hexyl methacrylate; glycidyl methacrylate; acrylic or methacrylic acid; and the like or a mixture of two or more thereof.

Of these, the preferred α-olefin is ethylene, and the preferred ethylenically unsaturated monomers are methyl acrylate, and glycidyl methacrylate. These are commercially available from Elf Atochem (Philadelphia, Pa.) under the tradenames Lotader™ AX8840 (a copolymer of ethylene and 8 wt % glycidyl methacrylate), Lotader™ AX8900 (a terpolymer of ethylene, 25 wt % methyl acrylate, and 8 wt % glycidyl methacrylate), and Lotader™ AX8920 (a terpolymer of ethylene, 26 wt % methyl acrylate, and 1 wt % glycidyl methacrylate).

It is also possible to use functional polyolefins which themselves are blends of the interpolymers of an alpha olefin with one or more ethylenically unsaturated monomers described and an additional component comprising a styrenic copolymer. Styrenic monomers of particular interest for use in preparation of a styrenic copolymer, in addition to styrene itself, include one or more of the substituted styrenes or vinyl aromatic compounds described by the following formula [it being understood that a reference to "styrene" as a comonomer in component (c) is to be read as a reference to any of the styrenic or vinyl aromatic monomers described herein or any others of like kind]:wherein each A is independently hydrogen, a C1–C6 alkyl radical or a halogen atom such as chlorine or bromine; and each E is independently hydrogen, a C1–C10 alkyl, cycloalkyl, alkenyl, cycloalkenyl, aryl, alkaryl, aralkyl or alkoxy radical, a halogen atom such as chlorine or bromine, or two E's may be joined to form a naphthalene structure. Representative examples of suitable styrenic monomers, in addition to styrene itself, include one or more of the following: ring-substituted alkyl styrenes, e.g. vinyl toluene, o-ethylstyrene, p-ethylstyrene, p-(t-butyl)styrene, 2,4-dimethylstyrene; ring-substituted halostyrenes, e.g., o-chlorostyrene, p-chlorostyrene, o-bromostyrene, 2,4-dichlorostyrene; ring-alkyl, ring-halo-substituted styrenes, e.g. 2-chloro-4-methylstyrene and 2,6-dichloro-4-methylstyrene; ar-methoxy styrene, vinylnaphthalene or anthracene, p-diisopropenylbenzene, di-vinylbenzene, vinylxylene, alpha-methylstyrene, and alpha-methylvinyltoluene.

Ethylenically unsaturated monomers of particular interest for copolymerization with a styrenic monomer include one or more of those described by the formula:

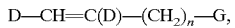

$$D\text{---}CH=C(D)\text{---}(CH_2)_n\text{---}G,$$

wherein each D independently represents a substituent selected from the group consisting of hydrogen, halogen (such as fluorine, chlorine or bromine), C1–C6 alkyl or alkoxy, or taken together represent an anhydride linkage; G is hydrogen, vinyl. C1–C12 alkyl, cycloalkyl, alkenyl, cycloalkenyl, alkaryl, arylalkyl, alkoxy, aryloxy, ketoxy, halogen (such as fluorine, chlorine or bromine), cyano or pyridyl; and n is 0–9.

Representative examples of ethylenically unsaturated monomers copolymerizable with a styrenic monomer are those which bear a polar or electronegative group and include one or more of the following: a vinyl nitrile compound such as acrylonitrile, methacrylonitrile, ethacrylonitrile, alphachloroacrylonitrile and fumaronitrile; a diene such as butadiene, isoprene, isobutylene, piperylene, cyclopentadiene, natural rubber, chlorinated rubber, 1,2-hexadiene, methyl-1,3-pentadiene, 2,3-dimethyl-1,3-1,3-pentadiene, 2-methyl-3-ethyl-1,3-butadiene, 2-ethyl-1,3-pentadiene, 1,3- and 2,4-hexadienes, chloro- and bromo substituted butadienes such as dichlorobutadiene, bromobutadiene, chloroprene and dibromobutadiene, and butadiene/isoprene and isoprene/isobutylene copolymers; 1,3-divinylbenzene; 2-phenyl propene; a C2–C10 alkylene compound including halo-substituted derivatives thereof such as vinyl or vinylidine chloride; the alpha, beta-ethylenically unsaturated carboxylic acids, such as acrylic acid, methacrylic acid, maleic acid, succinic acid, acotinic acid and itaconic acid, and their anhy-drides and C1–C10 alkyl, aminoalkyl and hydroxyalkylesters and amides, such as alkyl acrylates and methacrylates such as methyl acrylate, propyl acrylate, butyl acrylate, octyl acrylate, methyl alphachloro acrylate, methyl, ethyl or isobutyl methacrylate, hydroxyethyl and hydroxypropyl acrylates, aminoethyl acrylate and glycidyl methacrylate; maleic anhydride; an alkyl or aryl maleate or fumarate such as diethylchloromaleate or diethyl fumarate; an aliphatic or aromatic maleimide, such as N-phenyl maleimide, including the reaction product of a C1–C10 alkyl or C6–C14 aryl primary amine and maleic anhydride; methacrylamide, acrylamide or N.N-diethyl acrylamide; vinyl ketones such as methyl vinyl ketone or methyl isopropenyl ketone; vinyl or allyl acetate and higher alkyl or aryl vinyl or allyl esters; vinyl alcohols; vinyl ethers such as C1–C6 alkyl vinyl ether and their alkyl-substituted halo derivatives; vinyl pyridines; vinyl furans; vinyl aldehydes such as acrolein or crotonaldehyde; vinylcarbazole; vinyl pyrrolidone; N-vinylphthalimide; and anoxazoline compound. Also included are the various anti drip agents including but not limited to, polyterafluroethylene (PTFE) such as Teflon™ (product and trade mark of Du Pont Chemical).

Examples of preferred styrenic copolymers are vinyl aromatic/vinyl nitrile copolymers such as styrene/acrylonitrile copolymer ("SAN"), styrene/maleic anhydride copolymer, styrene/glycidyl methacrylate copolymer, arylmaleimimde/vinyl nitrile/diene/styrenic copolymer, styrene/alkyl methacrylate copolymer, styrene/alkylmethacrylate/glydicyl methacrylate copolymer, styrene/butyl acrylate copolymer, methyl methacryalte/acrylonitrile/butadiene/styrene copolymer, or a rubber-modified vinyl aromatic/vinyl nitrile copolymer such as an ABS, AES or ASA copolymer. Of these, preferred are the vinyl aromatic/vinyl nitrile copolymers such as tyrene/ acrylonitrile copolymer ("SAN"), styrene/maleic anhydride copolymer, styrene/glycidyl methacrylate copolymer, and most preferred is the styrene/acrylonitrile copolymer ("SAN"), Additives and Fillers A variety of additives may be advantageously employed to promote flame retardance or ignition resistance in the compositions of this invention. Representative examples thereof include the oxides and halides of the metals of Groups IVA and VA of the periodic table such as the oxides and halides of antimony, bismuth, arsenic, tin and lead such as antimony oxide, antimony chloride, antimony oxychloride, stannic oxide, stannic chloride and arsenous oxide; the organic and inorganic compounds of phosphorous, nitrogen, boron and sulfur such as aromatic phosphates and phosphonates (including halogenated derivatives thereof), alkyl acid phosphates, tributoxyethyl phosphate, 1,3-dichloro-2-propanol phosphate, 3,9-tribromoneopentoxy-2,4,8,10-tetraoxa-3,9-diphosphaspiro (5.5)undecane-3,9-dioxide, phosphine oxides, ammonium phosphate, zinc borate, thiourea, urea, ammonium sulfamate, ammonium polyphos phoric acid and stannic sulfide; the oxides, halides and hydrates of other metals such as titanium, vanadium, chromium and magnesium such as titanium dioxide, chromic bromide, zirconium oxide, ammonium molybdate and stannous oxide hydrate; antimony compounds such as antimony phosphate, sodium antimonate, KSb(OH)6, NH4 SbF6 and SbS3; antimonic esters of inorganic acids, cyclic alkyl antimonite esters and aryl antimonic acid compounds such as potassium antimony tartrate, the antimony salt of caproic acid, $Sb(OCH_2 CH_3)$, $Sb[OCH(CH_3)CH_2 CH_3]_3$, antimony polyethylene glycorate, pentaerythritol antimonite and triphenyl antimony; boric acid; alumina trihydrate; ammonium fluoroborate; molybdenum oxide; halogenated hydrocarbons such as hexabromocyclodecane; decabromomdiphenyloxide; 1,2-bis(2,4,6-tribromophenoxy) ethane; halogenated carbonate oligomers such as those prepared from Tetrabromobisphenol-A; halogenated epoxy resins such as brominated glycidyl ethers; tetrabromo phthalic anhydride; fluorinated olefin polymers or copolymers such as poly (tetrafluoroethylene); octabromodiphenyl oxide; ammonium bromide; isopropyl di(4-amino benzoyl) isostearoyl titanate, and metal salts of aromatic sulfur compounds such as sulfates, bisulfates, sulfonates, sulfonamides and sulfimides; other alkali metal and alkaline earth metal salts of sulfur, phosphorus and nitrogen compounds; and others as set forth in Laughner, U.S. Pat. No. 4,786,686, which is incorporated herein; and the like, and mixtures thereof A preferred flame retardant additive is antimony trioxide ($Sb_2O_3$). When a flame retardant is used in the compositions of this invention, it is typically used in an amount of up to about 15 percent, advantageously from about 0.01 to 15 percent, preferably from about 0.1 to 10 percent and more preferably from about 0.5 to 5 percent, by weight of the total composition.

A variety of additives may be advantageously used in the compositions of this invention for other purposes such as the following: antimicrobial agents such as organometallics, isothtazolones, organosulfurs and mercaptans; antioxidants such as phenolics, secondary amines, phophites and thioesters; antistatic agents such as quaternary ammonium compounds, amines, and ethoxylated, propoxylated or glycerol compounds; hydrolytic stabilizers; lubricants such as fatty acids, fatty alcohols, esters, fatty amides, metallic stearates, paraffinic and microcrystalline waxes, silicones and orthophosphoric acid esters; mold release agents such as fine-particle or powdered solids, soaps, waxes, silicones, polyglycols and complex esters such as trimethylolpropane tristearate or pen-taerythritol tetrastearate; pigments, dyes and colorants; plasticizers such as esters of dibasic acids (or their anhydrides) with monohydric alcohols such as o-phthalates, adipates and benzoates; heat stabilizers such as organotin mercaptides, an octyl ester of thioglycolic acid and a barium or cadmium carboxyalte; ultraviolet light stabilizers such as a hindered amine, an o-hydroxyphenylbenzotriazole, a 2-hydroxy,4-alkoxybenzophenone, a salicylate, a cyanoacrylate, a nickel chelate and a benzylidene malonate and oxalanilide. Preferred hindered phenolic antioxidants are Irganox™ 1076 antioxidant, available from Ciba-Geigy Corp, Irganox™ 1010, phosphites (e.g., Irgafos™ 168).

Additives such as U.V. stabilizers, cling additives (e.g., polyisobutylene), antiblock additives, colorants, pigments, fillers, slip agents (e.g stearamide and/or erucamide) and the like can also be included in the interpolymers employed in the blends of and/or employed in the present invention, to the extent that they do not interfere with the enhanced properties discovered by Applicants.

Also included as a potential component of the polymer compositions used in the present invention are various organic and inorganic fillers, the identity of which depends upon the type of application in the blend is to be utilized. Representative examples of such fillers include organic and inorganic fibers such as those made from asbestos, boron, graphite, ceramic, glass, metals (such as stainless steel) or polymers (such as aramid fibers) talc, carbon black, carbon fibers, calcium carbonate, alumina trihydrate, glass fibers, marble dust, cement dust, clay, feldspar, silica or glass, fumed silica, alumina, magnesium oxide, magnesium hydroxide, antimony oxide, zinc oxide, barium sulfate, aluminum silicate, calcium silicate, titanium dioxide, titanates, aluminum nitride, $B_2O_3$, nickel powder or chalk.

Other representative organic or inorganic, fiber or mineral, fillers include carbonates such as barium, calcium or magnesium carbonate; fluorides such as calcium or sodium aluminum fluoride; hydroxides such as aluminum hydroxide; metals such as aluminum, bronze, lead or zinc; oxides such as aluminum, antimony, magnesium or zinc oxide, or silicon or titanium dioxide; silicates such as asbestos, mica, clay (kaolin or calcined kaolin), calcium silicate, feldspar, glass (ground or flaked glass or hollow glass spheres or microspheres or beads, whiskers or filaments), nepheline, perlite, pyrophyllite, talc or wollastonite; sulfates such as barium or calcium sulfate; metal sulfides; cellulose, in forms such as wood or shell flour; calcium terephthalate; and liquid crystals. Mixtures of more than one such filler may be used as well.

The additives are employed in functionally equivalent amounts known to those skilled in the art. For example, the amount of antioxidant employed is that amount which prevents the polymer or polymer blend from undergoing oxidation at the temperatures and environment employed during storage and ultimate use of the polymers. Such amount of antioxidants is usually in the range of from 0.01 to 10, preferably from 0.05 to 5, more preferably from 0.1 to 2 percent by weight based upon the weight of the polymer or polymer blend. Similarly, the amounts of any of the other enumerated additives are the functionally equivalent amounts such as the amount to render the polymer or polymer blend antiblocking, to produce the desired amount of filler loading to produce the desired result, to provide the desired color from the colorant or pigment. Such additives can suitably be employed in the range of from 0.05 to 50, preferably from 0.1 to 35, more preferably from 0.2 to 20 percent by weight based upon the weight of the polymer or polymer blend. However, in the instance of fillers, they could be employed in amounts up to 90 percent by weight based on the weight of the polymer or polymer blend. Additives such as fillers also play a role in the aesthetics of a final article providing a gloss or matte finish.

The Final Blend Compositions

The compositions of the present invention are prepared by any convenient method, including dry blending the individual components and subsequently melt mixing or melt compounding, either directly in the extruder or mill used to make the finished article (e.g., the automotive part), or by pre-melt mixing in a separate extruder or mill (e.g., a Banbury mixer).

There are many types of molding operations which can be used to form useful fabricated articles or parts from the present compositions, including thermoforming and various injection molding processes (e.g., that described in Modern Plastics Encyclopedia/89, Mid October 1988 Issue, Volume 65, Number 11, pp. 264–268, "Introduction to Injection Molding" and on pp. 270–271, "Injection Molding Thermoplastics", the disclosures of which are incorporated herein by reference) and blow molding processes (e.g., that described in Modern Plastics Encyclopedia/89, Mid October 1988 Issue, Volume 65, Number 11, pp. 217–218, "Extrusion-Blow Molding", the disclosure of which is incorporated herein by reference) and profile extrusion. Also included are direct blending and final part formation in a single melt processing operation to fabricate, for example, sheets and films. Some of the fabricated articles include sports articles, containers such as for food or other household articles, footwear, and automotive articles, such as soft facia. The compositions of the present invention, in combination with the final part forming operation, can be selected to control part aesthetics such as a gloss or matte appearance.

a) Properties of the α-Olefin/Hindered Vinyl or Vinylidene Interpolymer and Engineering Thermoplastic Blend Compositions The polymer compositions of the present invention comprise from about 1 to 80, preferably from about 1 to 65, more preferably from about 1 to 50 wt % (based on the combined weights of the substantially random interpolymer component and the engineering thermoplastic component) of one or more interpolymers of one or more α-olefins and one or more vinyl or vinylidene aromatic monomers and/or one or more hindered aliphatic or cycloaliphatic vinyl or vinylidene monomers.

These substantially random interpolymers usually contain from about 0.5 to about 50 preferably from about 20 to about 50, more preferably from about 30 to about 45 mole percent of at least one vinyl or vinylidene aromatic monomer and/or hindered aliphatic or cycloaliphatic vinyl or vinylidene monomer and from about 50 to about 99.5, preferably from about 50 to about 80, more preferably from about 55 to about 70 mole percent of at least one aliphatic α-olefin having from 2 to about 20 carbon atoms.

The number average molecular weight (Mn) of the substantially random interpolymer used in the present invention is greater than about 1000, preferably from about 5,000 to about 1,000,000, more preferably from about 10,000 to about 500,000.

The melt index ($I_2$) of the substantially random interpolymer used in the present invention is from about 0.01 to about 100, preferably of from about 0.01 to about 10, more preferably of from about 0.01 to about 5.0 g/10 min.

The molecular weight distribution ($M_w/M_n$) of the substantially random interpolymer used in the present invention is from about 1.5 to about 20, preferably of from about 1.8 to about 10, more preferably of from about 2 to about 5.

The compositions of the present invention can also comprise from 20 to about 99, preferably from 35 to about 99, more preferably from 50 to about 99 percent of by weight of at least one engineering thermoplastic (based on the combined weights of the substantially random interpolymer component and the engineering thermoplastic component) which can comprise acetal and acrylic resins, polyamides (e.g. nylon-6, nylon 6,6,), polyimides, polyetherimides, cellulosics, polyesters, poly(arylate), aromatic polyesters, poly(carbonate), poly(butylene) and polybutylene and polyethylene terephthalates, polyethers, polycyclopentanes, and its copolymers, polymethylpentane, poly(carbonate), polyethylene terephthalate and polybutylene terephthalate. Of these preferred are poly(carbonate), polyethylene terephthalate and polybutylene terephthalate, and most preferred is poly(carbonate).

The weight average molecular weight (Mw) of the engineering thermoplastic used to prepare the blends of the present invention is from about 10,000 to about 40,000, preferably from about 15,000 to about 38,000, more preferably from about 20,000 to about 36,000.

The melt flow rate of the engineering thermoplastic used to prepare the blends of the present invention is from about 2 to about 80, preferably of from about 4 to about 30, more preferably of from about 6 to about 30 g/10 min.

b) Properties of the α-Olefin/Hindered Vinyl or Vinylidene Interpolymer/Engineering Thermoplastic/Polyolefin Elastomer/Functional Polyolefin Blend Compositions The polymer compositions of the present invention comprise from about 1 to 80, preferably from about 1 to 65, more preferably from about 1 to 50 wt % (based on the combined weights of the substantially random interpolymer component and the engineering thermoplastic component) of one or more interpolymers of one or more α-olefins and one or more vinyl or vinylidene aromatic monomers and/or one or more hindered aliphatic or cycloaliphatic vinyl or vinylidene monomers.

These substantially random interpolymers usually contain from about 0.5 to about 50 preferably from about 20 to about 50, more preferably from about 30 to about 45 mole percent of at least one vinyl or vinylidene aromatic monomer and/or hindered aliphatic or cycloaliphatic vinyl or vinylidene monomer and from about 50 to about 99.5, preferably from about 50 to about 80, more preferably from about 55 to about 70 mole percent of at least one aliphatic α-olefin having from 2 to about 20 carbon atoms.

The number average molecular weight (Mn) of the substantially random interpolymer is greater than about 1000, preferably from about 5,000 to about 1,000,000, more preferably from about 10,000 to about 500,000.

The melt index ($I_2$) of the substantially random interpolymer used in the present invention is from about 0.01 to about 100, preferably of from about 0.01 to about 10, more preferably of from about 0.01 to about 5.0 g/10 min.

The molecular weight distribution ($M_w/M_n$) of the substantially random interpolymer is from about 1.5 to about 20, preferably of from about 1.8 to about 10, more preferably of from about 2 to about 5.

The compositions of the present invention can also comprise from 20 to about 99, preferably from 35 to about 99, more preferably from 50 to about 99 percent of by weight of at least one engineering thermoplastic (based on the combined weights of the substantially random interpolymer component and the engineering thermoplastic component) which can comprise acetal and acrylic resins, polyamides (e.g. nylon-6, nylon 6,6,), polyimides, polyetherimides, cellulosics, polyesters, poly(arylate), aromatic polyesters, poly(carbonate), poly(butylene) and polybutylene and polyethylene terephthalates, polyethers, polycyclopentanes, and its copolymers, polymethylpentane, poly(carbonate), polyethylene terephthalate and polybutylene terephthalate. Of these preferred are poly(carbonate), polyethylene terephthalate and polybutylene terephthalate, and most preferred is poly(carbonate).

The weight average molecular weight (Mw) of the engineering thermoplastic used to prepare the blends of the present invention is from about 10,000 to about 40,000, preferably from about 15,000 to about 38,000, more preferably from about 20,000 to about 36,000.

The melt flow rate of the engineering thermoplastic used to prepare the blends of the present invention is from about 2 to about 80, preferably of from about 4 to about 30, more preferably of from about 6 to about 30 g/10 min.

The polymer compositions of the present invention comprise from about 15 to 30, preferably from about 10 to 20, more preferably from about 3 to 15 wt % (based on the combined weights of the individual blend components) of one or more polyolefin elastomers.

The melt index ($I_2$) of the polyolefin elastomer blend component is from about 0.01 to about 100, preferably of from about 0.1 to about 10, more preferably of from about 0.25 to about 5.0 g/10 min.

The density of the polyolefin elastomer blend component is from about 0.860 to about 0.900, preferably of from about 0.860 to about 0.895 more preferably of from about 0.860 to about 0.885 g/cm$^3$.

The polyolefin elastomer is a homogeneous or heterogeneous interpolymer comprising between about 50 to 95 weight percent ethylene and about 5 to 50, and preferably 10 to 25, weight percent of at least one alpha-olefin comonomer. The comonomer content is measured using infrared spectroscopy according to ASTM D-2238, Method B. Typically, the polyolefin elastomers are copolymers of ethylene and one or more alpha-olefins of 3 to about 20 carbon atoms (e.g. propylene, 1-butene, 1-hexene, 4-methyl-1-pentene, 1-heptene, 1-octene and/or styrene), preferably alpha-olefins of 3 to about 10 carbon atoms, and more preferably these polymers are a copolymer of ethylene and 1-octene.

Preferably the polyolefin elastomer is a homogeneous interpolymer and most preferably is a substantially linear interpolymer. For substantially linear polyolefin elastomers, the melt flow ratio, measured as $I_{10}/I_2$, is greater than or equal to 5.63, is preferably from about 6.5 to 15, and is more preferably from about 7 to 10. Their molecular weight distribution [weight average molecular weight divided by number average molecular weight (Mw/Mn)], measured by gel permeation chromatography (GPC), is defined by the equation: Mw/Mn$\leq$($I_{10}/I_2$)−4.63, and is preferably between about 1.5 and 2.5. For substantially linear ethylene polymers, the I10/I2 ratio indicates the degree of long-chain branching, i.e. the larger the I10/I2 ratio, the more long-chain branching in the polymer.

The polymer compositions of the present invention comprise from about 0.5 to 20, preferably from about 0.5 to 15, more preferably from about 1 to 10 wt % (based on the combined weights of the individual blend components) of one or more functional polyolefins which comprise interpolymers of an alpha olefin with one or more ethylenically unsaturated monomers.

Of these, the preferred α-olefin is ethylene, and the preferred ethylenically unsaturated monomers are methyl acrylate, and glycidyl methacrylate. Also preferred are blends of the α-olefin/ ethylenically unsaturated interpolymer and a styrenic copolymer. Examples of preferred styrenic copolymers are vinyl aromatic/vinyl nitrile copolymers such as styrene/acrylonitrile copolymer ("SAN"), styrene/maleic anhydride copolymer, styrene/glycidyl methacrylate copolymer, arylmaleimimde/vinyl nitrile/diene/styrenic copolymer, styrene/alkyl methacrylate copolymer, styrene/alkylmethacrylate/glydicyl methacrylate copolymer, styrene/butyl acrylate copolymer, methyl methacryalte/acrylonitrile/butadiene/styrene copolymer. Of these, preferred are the vinyl aromatic/vinyl nitrile copolymers such as styrene/acrylonitrile copolymer ("SAN"), styrene/maleic anhydride copolymer, styrene/glycidyl methacrylate copolymer, and most preferred is the styrene/acrylonitrile copolymer ("SAN").

The following examples are illustrative of the invention, but are not to be construed as to limiting the scope thereof in any manner.

EXAMPLES

Test Methods a) Melt Flow Measurements

The molecular weight of the substantially random interpolymer compositions and the ethylene/α-olefin copolymers for use in the present invention is conveniently indicated using a melt index measurement according to ASTM D-1238, (Condition 190° C./2.16 kg, formally known as "Condition (E)" and also known and abbreviated as $I_2$) was determined. Melt index is inversely proportional to the molecular weight of the polymer. Thus, the higher the molecular weight, the lower the melt index, although the relationship is not linear.

The molecular weight of the engineering thermoplastic polycarbonate components used in the present invention are conveniently indicated using a melt index measurement according to ASTM Designation D 1238-89, (Condition 300/1.2) also known and abbreviated as (MFR).

b) Styrene Analyses

Interpolymer styrene content and atactic polystyrene concentration were determined using proton nuclear magnetic resonance ($^1$H N.M.R). All proton NMR samples were prepared in 1,1,2,2-tetrachloroethane-d$_2$ (TCE-d$_2$). The resulting solutions were 1.6–3.2 percent polymer by weight. Melt index ($I_2$) was used as a guide for determining sample concentration. Thus when the $I_2$ was greater than 2 g/10 min, 40 mg of interpolymer was used; with an $I_2$ between 1.5 and 2 g/10 min, 30 mg of interpolymer was used; and when the $I_2$ was less than 1.5 g/10 min, 20 mg of interpolymer was used. The interpolymers were weighed directly into 5 mm sample tubes. A 0.75 mL aliquot of TCE-d$_2$ was added by syringe and the tube was capped with a tight-fitting polyethylene cap. The samples were heated in a water bath at 85° C. to soften the interpolymer. To provide mixing, the capped samples were occasionally brought to reflux using a heat gun.

Proton NMR spectra were accumulated on a Varian VXR 300 with the sample probe at 80° C., and referenced to the residual protons of TCE-d$_2$ at 5.99 ppm. The delay times were varied between 1 second, and data was collected in triplicate on each sample. The following instrumental conditions were used for analysis of the interpolymer samples:

Varian VXR-300, standard $^1$H:

Sweep Width, 5000 Hz

Acquisition Time, 3.002 sec

Pulse Width, 8 μsec

Frequency, 300 MHz

Delay, 1 sec

Transients, 16

The total analysis time per sample was about 10 minutes.

Initially, a $^1$H NMR spectrum for a sample of the polystyrene, Styron™ 680 (available form the Dow Chemical Company, Midland, Mich.) was acquired with a delay time of one second. The protons were "labeled": b, branch; a, alpha; o, ortho; m, meta; p, para, as shown in FIG. 1.

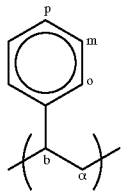

FIG. 1

Integrals were measured around the protons labeled in FIG. 1; the 'A' designates aPS. Integral $A_{7.1}$ (aromatic, around 7.1 ppm) is believed to be the three ortho/para protons; and integral $A_{6.6}$ (aromatic, around 6.6 ppm) the two meta protons. The two aliphatic protons labeled α resonate at 1.5 ppm; and the single proton labeled b is at 1.9 ppm. The aliphatic region was integrated from about 0.8 to 2.5 ppm and is referred to as $A_{a1}$. The theoretical ratio for $A_{7.1}$: $A_{6.6}$: $A_{a1}$ is 3: 2: 3, or 1.5:1:1.5, and correlated very well with the observed ratios for the Styron≐ 680 sample for several delay times of 1 second. The ratio calculations used to check the integration and verify peak assignments were performed by dividing the appropriate integral by the integral $A_{66}$ Ratio $A_r$ is $A_{7.1}/A_{6.6}$.

Region $A_{6.6}$ was assigned the value of 1. Ratio A1 is integral $A_{a1}/A_{6.6}$. All spectra collected have the expected 1.5:1:1.5 integration ratio of (o+p): m: (α+b). The ratio of aromatic to aliphatic protons is 5 to 3. An aliphatic ratio of 2 to 1 is predicted based on the protons labeled α and b respectively in FIG. 1. This ratio was also observed when the two aliphatic peaks were integrated separately.

For the ethylene/styrene interpolymers, the $^1$H NMR spectra using a delay time of one second, had integrals $C_{7.1}$, $C_{6.6}$, and $C_{a1}$ defined, such that the integration of the peak at 7.1 ppm included all the aromatic protons of the copolymer as well as the o & p protons of aPS. Likewise, integration of the aliphatic region $C_{a1}$ in the spectrum of the interpolymers included aliphatic protons from both the aPS and the interpolymer with no clear baseline resolved signal from either polymer. The integral of the peak at 6.6 ppm $C_{6.6}$ is resolved from the other aromatic signals and it is believed to be due solely to the aPS homopolymer (probably the meta protons). (The peak assignment for atactic polystyrene at 6.6 ppm (integral $A_{6.6}$) was made based upon comparison to the authentic sample Styron™ 680.) This is a reasonable assumption since, at very low levels of atactic polystyrene, only a very weak signal is observed here. Therefore, the phenyl protons of the copolymer must not contribute to this signal. With this assumption, integral $A_{6.6}$ becomes the basis for quantitatively determining the aPS content.

The following equations were then used to determine the degree of styrene incorporation in the ethylene/styrene interpolymer samples:

$$(C\ Phenyl) = C_{7.1} + A_{7.1} - (1.5 \times A_{6.6})$$

$$(C\ Aliphatic) = C_{a1} - (15 \times A_{6.6})$$

$$S_c = (C\ Phenyl)/5$$

$$e_c = (C\ Aliphatic - (3 \times s_c))/4$$

$$E = e_c/(e_c + s_c)$$

$$S_c = s_c/(e_c + s_c)$$

and the following equations were used to calculate the mol % ethylene and styrene in the interpolymers.

$$Wt\% \ E = \frac{E*28}{(E*28)+(S_c*104)}(100)$$

and $$Wt\% \ S = \frac{S_c*104}{(E*28)+(S_c*104)}(100)$$

where: $s_c$ and $e_c$ are styrene and ethylene proton fractions in the interpolymer, respectively, and $S_c$ and E are mole fractions of styrene monomer and ethylene monomer in the interpolymer, respectively.

The weight percent of aPS in the interpolymers was then determined by the following equation:

$$Wt\% \ aPs = \frac{(Wt\%S)*\left(\frac{\frac{A_{6.2}}{2}}{S_c}\right)}{100 + \left[(Wt\%S)*\left(\frac{\frac{A_{6.2}}{2}}{S_c}\right)\right]}*100$$

The total styrene content was also determined by quantitative Fourier Transform Infrared spectroscopy (FTIR).

c) Deflection Temperature Under Load (D.T.U.L.)

Deflection temperature under load ("D.T.U.L.") is measured in accordance with ASTM Designation D 648-82 at 66 psi.

d) Differential Scanning Calorimetry (DSC)

A DuPont DSC-2210 was used to measure the thermal transition temperatures and heat of transition for the samples. In order to eliminate previous thermal history, samples were first heated to about 160° C. Heating and cooling curves were recorded at 10° C./min. Melting ($t_m$ from second heat) and crystallization ($t_c$) temperatures were recorded from the peak temperatures of the endotherm and exotherm, respectively.

e) Impact Resistance

Impact resistance is measured by the Izod test ("Izod") according to ASTM Designation D 256-84 (Method A) at −29° C. and 25° C. The notch is 10 mils (0.254 mm) in radius. Impact is perpendicular to the flow lines in the plaque from which the bar is cut. Izod results are reported in ft-lb/in.

f) Color

Samples were quantified in terms of colorability using ASTM standard, E1331-96, (Standard Test Method for Reflectance Factor and Color by Spectrophotometry Using Hemispherical Geometry). The spectral reflectance vs wavelength data was obtained with a Hunter Associates Labaratory ColorQUEST™ II calorimeter. The L*, a*, and b* parameters were determined (with the specular component of the reflected data included) using the Commission Internationale de l'Eclairage (CIE) lab scale color scheme using the method as referenced in standard E308-96, (Standard Practice for Computing the Colors of Objects by Using the CIE System), also described in .US Pharmacopeia, USP 1995, Ed 23, General Chapter 1061. Under this scheme the closer the L value to 100, the closer the lightness of the sample to perfect whiteness. Similarly, the more negative the a* value, the greener the sample, the more positive the redder the sample, and the more negative the b* value the bluer the sample, the more positive the b* value, the more yellow the sample.

The Individual Blend Components

ESI #1

ESI #1 was a substantially random ethylene styrene interpolymer which had a styrene content of 37.1 wt % (13.7 mol %) and was prepared using the following cocatalyst and polymerization method. The actual polymerization conditions are summarized in Table 1.

Bis(hydrogenated-tallowalkyl)methylamine Cocatalyst Preparation

Methylcyclohexane (1200 mL) was placed in a 2L cylindrical flask. While stirring, bis(hydrogenated-tallowalkyl)methylamine (ARMEEN™ M2HT, 104 g, ground to a granular form) was added to the flask and stirred until completely dissolved. Aqueous HCl (1M, 200 mL) was added to the flask, and the mixture was stirred for 30 minutes. A white precipitate formed immediately. At the end of this time, LiB($C_6F_5$)$_4$·Et$_2$O.3 LiCl (Mw=887.3; 177.4 g) was added to the flask. The solution began to turn milky white. The flask was equipped with a 6" Vigreux column topped with a distillation apparatus and the mixture was heated (140° C. external wall temperature). A mixture of ether and methylcyclohexane was distilled from the flask. The two-phase solution was now only slightly hazy. The mixture was allowed to cool to room temperature, and the contents were placed in a 4 L separatory funnel. The aqueous layer was removed and discarded, and the organic layer was washed twice with $H_2O$ and the aqueous layers again discarded. The $H_2O$ saturated methylcyclohexane solutions were measured to contain 0.48 wt percent diethyl ether ($Et_2O$). The solution (600 mL) was transferred into a 1 L flask, sparged thoroughly with nitrogen, and transferred into the drybox. The solution was passed through a column (1" diameter, 6" height) containing 13× molecular sieves. This reduced the level of $Et_2O$ from 0.48 wt percent to 0.28 wt percent. The material was then stirred over fresh 13× sieves (20 g) for four hours. The $Et_2O$ level was then measured to be 0.19 wt percent. The mixture was then stirred overnight, resulting in a further reduction in $Et_2O$ level to approximately 40 ppm. The mixture was filtered using a funnel equipped with a glass frit having a pore size of 10–15 μm to give a clear solution (the molecular sieves were rinsed with additional dry methylcyclohexane). The concentration was measured by gravimetric analysis yielding a value of 16.7 wt percent.

Polymerization

The various ESI samples were prepared in a 6 gallon (22.7 L), oil jacketed, Autoclave continuously stirred tank reactor (CSTR). A magnetically coupled agitator with Lightning A-320 impellers provided the mixing. The reactor ran liquid full at 475 psig (3,275 kPa). Process flow was in at the bottom and out of the top. A heat transfer oil was circulated through the jacket of the reactor to remove some of the heat of reaction. At the exit of the reactor was a micromotion flow meter that measured flow and solution density. All lines on the exit of the reactor were traced with 50 psi (344.7 kPa) steam and insulated.

Ethylbenzene solvent was supplied to the reactor at 30 psig (207 kPa). The feed to the reactor was measured by a Micro-Motion mass flow meter. A variable speed diaphragm pump controlled the feed rate. At the discharge of the solvent pump, a side stream was taken to provide flush flows for the catalyst injection line (1 lb/hr (0.45 kg/hr)) and the reactor agitator (0.75 lb/hr(0.34 kg/hr)). These flows were measured by differential pressure flow meters and controlled by manual adjustment of micro-flow needle valves. Uninhibited styrene monomer was supplied to the reactor at 30 psig (207 kpa). The feed to the reactor was measured by a Micro-Motion mass flow meter. A variable speed diaphragm pump controlled the feed rate. The styrene streams was mixed with the remaining solvent stream. Ethylene was supplied to the reactor at 600 psig (4,137 kPa). The ethylene stream was measured by a Micro-Motion mass flow meter just prior to the Research valve controlling flow. A Brooks flow meter/controller was used to deliver hydrogen into the ethylene stream at the outlet of the ethylene control valve. The ethylene/hydrogen mixture combines with the solvent/styrene stream at ambient temperature. The temperature of the solvent/monomer as it enters the reactor was dropped to ~5° C. by an exchanger with −5° C. glycol on the jacket. This stream entered the bottom of the reactor. The three component catalyst system and its solvent flush also entered the reactor at the bottom but through a different port than the monomer stream. Preparation of the catalyst components took place in an inert atmosphere glove box. The diluted components were put in nitrogen padded cylinders and charged to the catalyst run tanks in the process area. From these run tanks the catalyst was pressured up with piston pumps and the flow was measured with Micro-Motion mass flow meters. These streams combine with each other and the catalyst flush solvent just prior to entry through a single injection line into the reactor.

Polymerization was stopped with the addition of catalyst kill (water mixed with solvent) into the reactor product line after the micromotion flow meter measuring the solution density. Other polymer additives can be added with the catalyst kill. A static mixer in the line provided dispersion of the catalyst kill and additives in the reactor effluent stream. This stream next entered post reactor heaters that provide additional energy for the solvent removal flash. This flash occurred as the effluent exited the post reactor heater and the pressure was dropped from 475 psig (3,275 kPa) down to ~250 mm of pressure absolute at the reactor pressure control valve. This flashed polymer entered a hot oil jacketed devolatilizer. Approximately 85 percent of the volatiles were removed from the polymer in the devolatilizer. The volatiles exited the top of the devolatilizer. The stream was condensed with a glycol jacketed exchanger and entered the suction of a vacuum pump and was discharged to a glycol jacket solvent and styrene/ethylene separation vessel. Solvent and styrene were removed from the bottom of the vessel and ethylene from the top. The ethylene stream was measured with a Micro-Motion mass flow meter and analyzed for composition. The measurement of vented ethylene plus a calculation of the dissolved gasses in the solvent/styrene stream were used to calculate the ethylene conversion. The polymer seperated in the devolatilizer was pumped out with a gear pump to a ZSK-30 devolatilizing vacuum extruder. The dry polymer exits the extruder as a single strand. This strand was cooled as it was pulled through a water bath. The excess water was blown from the strand with air and the strand was chopped into pellets with a strand chopper.

ESI #2

ESI #2 was a substantially random ethylene styrene interpolymer which had a styrene content of 54.3 wt % (24.2 mol %) and was prepared as for ESI #1 using the polymerization conditions summarized in Table 1 and having the properties summarized in Table 2.

ESI #3

ESI #3 was a substantially random ethylene styrene interpolymer which had a styrene content of 68.2 wt % (36.6 mol %) and was prepared as for ESI #1 using the polymerization conditions summarized in Table 1.

TABLE 1

Polymerization Conditions for ESI Samples 1–3

| Sample # | Reactor Temp C. | Solvent Flow lb/hr | Ethylene Flow lb/hr | Hydrogen Flow sccm | Styrene Flow lb/hr | % Conversion | Catalyst | Co-Catalyst | B/Ti Ratio | MMAO[c]/Ti Ratio |
|---|---|---|---|---|---|---|---|---|---|---|
| ESI #1 | 90.6 | 23.37 | 2.01 | 0 | 14.0 | 85.7 | A[a] | B[b] | 1.26 | 6 |
| ESI #2 | 73.6 | 15.02 | 1.30 | 0 | 9.7 | 88.3 | A[a] | B[b] | 1.24 | 6 |
| ESI #3 | 73.4 | 13.2 | 1.22 | 8 | 12.0 | 87.4 | A[a] | B[b] | 1.24 | 10 |

[a]Catalyst A is (t-butylamido)dimethyl(tetramethylcyclopentadienyl)silane-titanium (II) 1,3-pentadiene prepared as described in U.S. Pat. No. 5,556,928, Example 17
[b]Cocatalyst B is bis-hydrogenated tallowaklyl methylammonium tetrakis (pentafluorophenyl)borate.
[c]a modified methylaluminoxane commercially available from Akzo Nobel as MMAO-3A.
[d]SCCM is standard cm$^3$/min

TABLE 2

Properties of ESI Samples 1–3

| EST # | ESI Styrene (wt %) | ESI Styrene (mol %) | Atactic Polystyrene (wt %) | Melt Index, I$_2$ (g/10 m) |
|---|---|---|---|---|
| EST #1 | 37.1 | 13.7 | 12.4 | 0.66 |
| ESI #2 | 54.3 | 24.2 | 13.0 | 0.60 |
| ESI #3 | 68.2 | 36.6 | 10.1 | 0.89 |

PC#1

PC #1 was a polycarbonate having a 14 melt flow rate obtained from and having the registered trademark Calibre™ -300-14 of the supplier, the Dow Chemical Company, Midland Mich.

PC #2

PC #2 was a polycarbonate having a 10 melt flow rate obtained from and having the registered trademark Calibre™ -300-10 of the supplier, the Dow Chemical Company, Midland Mich.

ENGAGE™ 8180

ENGAGE™ 8180 POE was a substantially linear ethylene/octene interpolymer having a melt index, I$_2$, of 0.50 g/10 min, and a density of 0.863 g/cm$^3$, obtained from, and having the registered trademark of, the supplier, Dupont Dow Elastomers.

PET #1

PET #1 was a polyethylene terephthalate having an intrinsic viscosity of 0.77 dl/g obtained from and having the registered trademark Lieghter™ of the supplier, Inca International, Milan, Italy.

Preparation of the Blends

Example 1

Example 1 was a 2000 g blend sample containing 95% by weight of of PC #1 having a 14 melt flow rate and 5 wt % of ESI #1 which had a styrene content of 37.1 wt % (13.7 mol %). The individual components were tumble blended for 5 minutes and the dry blended material was then extruded into pellets on a 30 mm Werner Pfleiderer extruder at 280° C. barrel temperature. The extruded pellets were dried in an air draft oven at 100° C. for at least 3 hours. The dried pellets were injection molded on a 70 ton Arburg molding machine at 300° C. into test bars for further testing and analysis.

Example 2

Example 2 is a blend containing 95% by weight of PC #1 having a 14 melt flow rate and 5 wt % of ESI #3 which had a styrene content of 68.2 wt % (36.6 mol %). The blend was prepared essentially as for Example 1.

Example 3

Example 3 is a blend containing 95% by weight of PC #1 having a 14 melt flow rate and 5 wt % of ESI #2 which had a styrene content of 54.3 wt % (24.2 mol %). The blend was prepared essentially as for Example 1.

Comparative Experiment 1

Comparative Experiment 1 is a blend containing 95% by weight of PC #1 having a 14 melt flow rate and 5 wt % of ENGAGE™ 8180 having a melt index, I$_2$, of 0.50 g/10 min, and a density of 0.863 g/cm$^3$. The blend was prepared essentially as for Example 1.

The results of testing of these samples are summarized in Table 3.

TABLE 3

| Example # | ESI # (wt % in blend) | PC # (wt % in blend) | Engage ™ 8180 (wt % in blend) | Izod (25° C.) (ft-lb/in) | Izod (−29° C.) (ft-lb/in) | DTUL C (264 psi) | Color | Optics |
|---|---|---|---|---|---|---|---|---|
| 1 | ESI 1 (5%) | PC 1 (95%) | N/A | 11.8 | 3.0 | 143 | Good | Opaque |
| 2 | ESI 3 (5%) | PC 1 (95%) | N/A | 12.2 | 4.0 | 144 | Good | Translucent |

TABLE 3-continued

| Example # | ESI # (wt % in blend) | PC # (wt % in blend) | Engage ™ 8180 (wt % in blend) | Izod (25° C.) (ft-lb/in) | Izod (−29° C.) (ft-lb/in) | DTUL C (264 psi) | Color | Optics |
|---|---|---|---|---|---|---|---|---|
| 3 | ESI 2 (5%) | PC 1 (95%) | N/A | 11.6 | 3.0 | 142 | Good | Opaque |
| Comp Ex 1 | N/A | PC 1 (95%) | ENGAGE 8180 (5%) | 12.1 | 2.5 | 141 | Poor | Opaque |

Analysis of the data in Table 3 indicate that the addition of the substantially random interpolymer of varying styrene content produces good colorability whereas the control sample containing the polyolefin elastomer (Engage™ 8180) exhibits poor colarability. Furthermore Example 2 in which the styrene content of the substantially random interpolymer is relatively high (68.2 wt %, 36.6 mol %) displays translucent optical appearance. The physical and mechanical properties including the low temperature Izod impact do not show any discernible differences among the examples and control.

Example 4

Example 4 is a blend containing 75% by weight of PET #1 having an intrinsic viscosity of 0.77 dl/g and 25 wt % of ESI #2 which had a styrene content of 54.3 wt % (24.2 mol %). The blend was prepared essentially as for Example 1.

Comparative Experiment 2

Comparative Experiment 2 is a sample of PET #1 having an intrinsic viscosity of 0.77 dl/g The results of Capilliary Rheology testing of these samples at 270° C. are summarized in Table 4.

TABLE 4

| $\gamma_{ap}$ (l/s) | Example 4 $\eta_{ap}$ (Pa s) | Comp. Exp. 2 $\eta_{ap}$ (Pa s) |
|---|---|---|
| 9.999e1 | 3.6641e1 | 3.0534e1 |
| 2.1496e2 | 1.7044e1 | 1.7044e1 |
| 4.6403e2 | 7.8959e0 | 3.5532e1 |
| 1.0000e3 | 1.2823e1 | 3.1742e1 |
| 2.1500e3 | 1.1361e1 | 2.5846e1 |
| 4.6400e3 | 8.5543e0 | 2.0399e1 |

Analysis of the viscosity versus shear rate data in Table 5 show that a blend of a substantially random ethylene/styrene interpolymer and polyethylene terephthalate (PET) typically results in a lower values of $\eta_{ap}$ for the same $\gamma_{ap}$ and hence an improvement in processability over the PET alone.

Example 5

Example 5 is a blend containing 88% by weight of PC #2 having a 10 g/10 min melt flow rate, 5 wt % of ESI #3 which had a styrene content of 68.2 wt % (36.6 mol %), 5 wt % of ENGAGE™ 8180 having a melt index, $I_2$, of 0.50 g/10 min, and a density of 0.863 g/cm$^3$, and 2 wt % of a blend of 75 wt % of an ethylene/methyl acrylate/glycidyl methacrylate terpolymer (Lotader™ AX8900) and 25 wt % of a styrene/acrylonitrile (SAN) copolymer. The blend was prepared essentially as for Example 1.

Comparative Experiment 3

Comparative Experiment 3 is a blend containing 93% by weight of PC #2 having a 10 g/10 min melt flow rate, 5 wt % of ENGAGE™ 8180 having a melt index, $I_2$, of 0.50 g/10 min, and a density of 0.863 g/cm$^3$, and 2 wt % of a blend of 75 wt % of an ethylene/methyl acrylate/glycidyl methacrylate terpolymer (Lotader™ AX8900) and 25 wt % of a styrene/acrylonitrile (SAN) copolymer The blend was prepared essentially as for Example 1.

Comparative Experiment 4

Comparative Experiment 4 is a blend containing 90% by weight of PC #2 having a 10 g/10 min melt flow rate, 5 wt % of ESI #3 which had a styrene content of 68.2 wt % (36.6 mol %), and 5 wt % of ENGAGE™ 8180 having a melt index, $I_1$, of 0.50 g/10 min, and a density of 0.863 g/cm$^3$. The blend was prepared essentially as for Example 1.

Comparative Experiment 5

Comparative Experiment 5 is a blend containing 93% by weight of PC #2 having a 10 g/10 min melt flow rate, 5 wt % of ESI #3 which had a styrene content of 68.2 wt % (36.6 mol %), and 2 wt % of a blend of 75 wt % of an ethylene/methyl acrylate/glycidyl methacryl ate terpolymer (Lotader™ AX8900) and 25 wt % of a styrene/acrylonitrile (SAN) copolymer. The blend was prepared essentially as for Example 1.

The results of testing of these samples are summarized in Table 5.

TABLE 5

| Example # | PC #2 (wt % in blend) | ESI #3 (wt % in blend) | Engage ™ 8180 (wt % in blend) | E/MA/GMA/ SAN | Izod (25° C.) (ft-lb/in) | Izod (−29° C.) (ft-lb/in) | DTUL C (264 psi) | Color |
|---|---|---|---|---|---|---|---|---|
| Ex 5 | 88.0% | 5% | 5% | 2% | 14.3 | 13.5 | 124 | Good |
| Comp Expt. 3 | 93.0% | N/A | 5% | 2% | 12.8 | 13.4 | 125 | Poor |
| Comp Exp. 4 | 90.0% | 5% | 5% | N/A | 13.0 | 4.7 | 124 | Good |

TABLE 5-continued

| Example # | PC #2 (wt % in blend) | ESI #3 (wt % in blend) | Engage ™ 8180 (wt % in blend) | E/MA/GMA/ SAN | Izod (25° C.) (ft-lb/in) | Izod (−29° C.) (ft-lb/in) | DTUL C (264 psi) | Color |
|---|---|---|---|---|---|---|---|---|
| Comp Exp. 5 | 93.0% | 5% | N/A | 2% | 15.3 | 4.6 | 125 | Good |

Analysis of data in Table 5 show that the four component blend of a substantially random interpolymer (ESI #3), the engineering thermoplastic (PC #2) A polyolefin elastomer (ENGAGE™ 8180) and a functional polyolefin (E/MA/GMA/SAN) results in a composition which has both good colorability and good low temperature impact performance.

To test for colarability was to determine how green a sample would look i.e. how negative the a* value when tumble blended prior to extrusion with the following green dye ingredients and amounts (based on the final weight of the polymer blend plus dye compositions):

1) 0.0379 wt % of Miles Yellow (a product of the Miles Chemical Company,)
2) 0.061 1 wt % Miles Green (a product of the Miles Chemical Company,)
3) 0.3939 wt % Ceba Brown (a product of the Ceba Geigy Chemical Company,)
4) 0.0071 wt % titanium dioxide. ps For the present invention good colorability is indicative of an a* value more negative than −10, and bad colarability less negative than −10.

The following samples were analyzed for colarability and the results are summarized in table 6.

TABLE 6

| Example # | PC #1 (wt % in blend) | PC #2 (wt % in blend) | ESI #1 (wt % in blend) | ESI #3 (wt % in blend) | Engage ™ 8180 (wt % in blend) | E/MA/ GMA/ SAN | L* | a* | b* | Color |
|---|---|---|---|---|---|---|---|---|---|---|
| Ex 1 | 95 | | 5 | | N/A | N/A | 40.68 | −13.67 | 16.69 | Good |
| Ex. 5 | | 88.0% | | 5% | 5% | 2% | 48.87 | −13.71 | 19.68 | Good |
| Comp Expt. 1 | 95 | N/A | N/A | N/A | 5% | N/A | 49.58 | −4.55 | 25.86 | Poor |

What is claimed is:

1. A blend of polymeric materials comprising
(A) of from about 1 to about 80 percent by weight (based on the combined weights of Components A and B) of at least one substantially random interpolymer; wherein said interpolymer;
  (1) contains of from about 0.5 to about 50 mole percent of polymer units derived from;
    (a) at least one vinyl or vinylidene aromatic monomer, or
    (b) at least one hindered aliphatic or cycloaliphatic vinyl or vinylidene monomer, or
    (c) a combination of at least one vinyl or vinylidene aromatic monomer and at least one hindered aliphatic or cycloaliphatic vinyl or vinylidene monomer;
  (2) contains of from about 50 to about 99.5 mole percent of polymer units derived from at least one aliphatic α-olefin having from 2 to 20 carbon atoms;
  (3) has a melt index ($I_2$) of from about 0.01 to about 100 g/10 min; and
  (4) has a molecular weight distribution ($M_w/M_n$) of from about 1.5 to about 20;
(B) of from about 20 to about 99 weight percent based on the combined weights of Components A, and B of one or more engineering thermoplastics
(C) of from about 15 to about 30 percent by weight (based on the combined weights of Components A, B, C, and D) of one or more polyolefin elastomers wherein said polyolefin elastomer;
  (1) has a melt index ($I_2$) of from about 0.01 to about 100 g/10 min; and
  (2) has a density of from about 0.860 to about 0.900 g/cm$^3$; and
(D) of from about 0.5 to about 20 percent by weight (based on the combined weights of Components A, B, C, and D) of one or more functional polyolefins.

2. The blend of claim 1 wherein;
(1) Component A is present in an amount of from about 1 to about 65 percent by weight (based on the combined weights of Components A and B);
(2) Component A contains of from about 20 to about 50 mole percent of polymer units derived from;
  (a) at least one of said vinyl or vinylidene aromatic monomers, Component A(1)(a), represented by the following general formula:

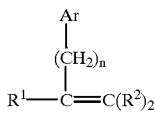

wherein $R^1$ is selected from the group of radicals consisting of hydrogen and alkyl radicals containing from 1 to about 4 carbon atoms, preferably hydrogen or methyl; each $R^2$ is independently selected from the group of radicals consisting of hydrogen and alkyl radicals containing from 1 to about 4 carbon atoms, preferably hydrogen or methyl; Ar is a phenyl group or a phenyl group substituted with from 1 to 5 substituents selected from the group consisting of halo, $C_{1-4}$-alkyl, and $C_{1-4}$-haloalkyl; and n has a value from zero to about 4; or
  (b) at least one of said hindered aliphatic or cycloaliphatic vinyl or vinylidene monomers, Component A(1)(b), represented by the following general formula;

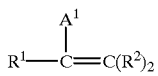

wherein $A^1$ is a sterically bulky, aliphatic or cycloaliphatic substituent of up to 20 carbons, $R^1$ is selected from the group of radicals consisting of hydrogen and alkyl radicals containing from 1 to about 4 carbon atoms, preferably hydrogen or methyl; each $R^2$ is independently selected from the group of radicals consisting of hydrogen and alkyl radicals containing from 1 to about 4 carbon atoms, preferably hydrogen or methyl; or alternatively $R^1$ and $A^1$ together form a ring system; or (c) a combination of at least one of said vinyl or vinylidene aromatic monomer and at least one of said hindered aliphatic or cycloaliphatic vinyl or vinylidene monomer;

(3) Component A contains of from about 50 to about 80 mole percent of polymer units derived from at least one of said aliphatic α-olefins selected from the group consisting of ethylene or a combination of ethylene and at least one of propylene, 4-methyl pentene, butene- 1, hexene- 1or octene- 1;

(4) Component A has a melt index ($I_2$) of from about 0.01 to about 10 g/10 min;

(5) Component A has a molecular weight distribution ($M_w/M_n$) of from about 1.8 to about 10; and (6) Component B is present in an amount of from about 35 to about 99 weight percent based on the combined weights of components A, and B and comprises acetal resins, acrylic resins, polyamides,nylon-6, nylon 6,6, polyimides, polyetherimides, cellulosics, polyesters, poly(arylate), aromatic polyesters, poly(carbonate), poly(butylene) and polybutylene and polyethylene terephthalates, polyethers, polycyclopentanes, and its copolymers, polymethylpentane, poly(carbonate), polyethylene terephthalate or polybutylene terephthalate;

(7) Component B has a molecular weight ($M_w$) of from about 10,000 to about 40,000; and (8) has a melt flow rate (MFR) of from about 2 to about 80 g/10 min.

3. The blend of claim 1 wherein;

(1) Component A is present in an amount of from about 1 to about 50 percent by weight (based on the combined weights of Components A and B);

(2) Component A contains of from about 30 to about 45 mole percent of polymer units derived from;
 (a) said vinyl or vinylidene aromatic monomer which comprises styrene, α-methyl styrene, ortho-, meta-, and para-methylstyrene, and the ring halogenated styrenes, or
 (b) said hindered aliphatic or cycloaliphatic vinyl or vinylidene monomers which comprises 5-ethylidene-2-norbornene or 1-vinylcyclo-hexene, 3-vinylcyclo-hexene, and 4-vinylcyclohexene; or
 (c) a combination of at least one of a) and b);

(3) Component A contains of from about 55 to about 70 mole percent of polymer units derived from said α-olefin, which comprises ethylene, or ethylene and at least one of propylene, 4-methyl-1-pentene, butene-1, hexene-1 or octene-1; or (4) Component A has a melt index ($I_2$) of from about 0.01 to about 5 g/10 min;

(5) Component A has a molecular weight distribution ($M_w/M_n$) of from about 2 to about 5; and (6) Component B is present in an amount of from about 50 to about 99 percent by weight (based on the combined weights of Components A and B) and comprises poly(carbonate), polyethylene terephthalate or polybutylene terephthalate;

(7) Component B has a molecular weight ($M_w$) of from about 15,000 to about 38,000; and (8) has a melt flow rate (MFR) of from about 4 to about 30 g/10 min.

4. A blend of claim 3 wherein i) said vinyl or vinylidene aromatic monomer, Component A1(a), is styrene;

ii) said aliphatic α-olefin, Component A2, is ethylene;

iii) said, Component B, is poly(carbonate).

5. A blend of claim 3 wherein i) said vinyl or vinylidene aromatic monomer, Component A1(a), is styrene;

ii) said aliphatic α-olefin, Component A2, is ethylene and propylene;

iii) said Component B, is poly(carbonate).

6. The blend of claim 1 further comprising a filler.

7. The blend of claim 1 further comprising one or more ignition resistance additives selected from halogenated hydrocarbons, halogenated carbonate oligomers, halogenated diglycidyl ethers, organophosphorous compounds, fluorinated olefins, antimony oxide and metal salts of aromatic sulfur compounds.

8. A blend of claim 1 wherein Component A is produced by polymerization in the presence of a metallocene or constrained geometry catalyst and a co-catalyst.

9. A blend of claim 1 in the form of a molded or extruded article.

10. A blend of claim 2 in the form of a molded or extruded article.

11. A blend of claim 3 in the form of a molded or extruded article.

12. A blend of claim 4 in the form of a molded or extruded article.

13. A blend of claim 5 in the form of a molded or extruded article.

14. A blend of claim 6 in the form of a molded or extruded article.

15. A blend of claim 7 in the form of a molded or extruded article.

16. A blend of claim 8 in the form of a molded or extruded article.

17. The blend of claim 1 wherein;

(I) Component C is present in an amount of from about 10 to about 20 percent by weight (based on the combined weights of Components A, B, C, and D) of one or more polyolefin elastomers wherein said polyolefin elastomer;
 (1) has a melt index ($I_2$) of from about 0.1 to about 10 g/10 min; and
 (2) has a density of from about 0.860 to about 0.895 g/cm$^3$; and (II) Component D is present in an amount of from about 0.5 to about 15 percent by weight (based on the combined weights of Components A, B, C, and D) of one or more functional polyolefins.

18. The blend of claim 1 wherein (I) Component C is present in an amount of from about 3 to about 15 percent by weight (based on the combined weights of Components A, B, C, and D) of one or more polyolefin elastomers wherein said polyolefin elastomer;
  (1) has a melt index ($I_2$) of from about 0.25 to about 5.0 g/10 min; and
  (2) has a density of from about 0.860 to about 0.885 g/cm$^3$; and (II) Component D is present in an amount of from about 1.0 to about 10 percent by weight (based on the combined weights of Components A, B, C, and D) of one or more functional polyolefins.

19. A blend of claim 17 in the form of a molded or extruded article.

20. A blend of claim 18 in the form of a molded or extruded article.

* * * * *

UNITED STATES PATENT AND TRADEMARK OFFICE
CERTIFICATE OF CORRECTION

PATENT NO. : 6,329,450 B1
DATED : December 11, 2001
INVENTOR(S) : Ogoe et al.

It is certified that error appears in the above-identified patent and that said Letters Patent is hereby corrected as shown below:

Title page,
Item [56], U.S. PATENT DOCUMENTS, 21st. reference, please delete "et al."

Column 1,
Line 64, after "copolymer" insert -- . --.

Column 4,
Line 11, delete "*Method*" and insert -- *METHOD* --.

Column 5,
Line 41, delete "nobomenes" and insert -- norbornenes --.

Column 7,
Line 43, after "3,4," delete the space.

Column 9,
Line 10, delete the second "." and insert -- , --.

Column 10,
Line 61, delete "$C_2$" and insert -- $C_{12}$ --.

Column 11,
Line 2, delete "$C_{2-C30}$" and insert -- $C_2$-$C_{30}$ --.
Line 5, delete "[2.2.]" and insert -- [2.2.1] --.

Column 12,
Line 24, delete "$C_{4-C7}$" and insert -- $C_4$-$C_7$ --.
Line 39, delete "$C_{6-C10}$" and insert -- $C_6$-$C_{10}$ --.
Line 46, delete "$C_{2-C10}$" and insert -- $C_2$-$C_{10}$ --.

Column 18,
Line 52, delete "anoxazoline" and insert -- an oxaxoline --.
Line 63, delete "methacryalte/" and insert -- methacrylate/--.
Line 67, delete "tyrene/" and insert -- styrene/ --.

Column 19,
Line 50, after "thereof" insert -- . --.

UNITED STATES PATENT AND TRADEMARK OFFICE
CERTIFICATE OF CORRECTION

PATENT NO. : 6,329,450 B1
DATED : December 11, 2001
INVENTOR(S) : Ogoe et al.

It is certified that error appears in the above-identified patent and that said Letters Patent is hereby corrected as shown below:

Column 20,
Line 8, delete "carboxyalte" and insert -- carboxylate --.

Column 22,
Line 9, after "percent" delete "of".

Column 23,
Line 61, delete "$(I_{10/I2})$" and insert -- $(I_{10}/I_2)$ --.
Line 63, delete "I10/I2" and insert -- $I_{10}/I_2$ --.
Line 64, delete "I10/I2" and insert -- $I_{10}/I_2$ --.

Column 25,
Line 39, after "Styron" delete "≐" and insert -- $^{TM}$ --.

Column 26,
Line 9, delete "$(15xA_{6.6})$" and insert -- $(1.5xA_{6.6})$ --.
Line 15, delete "$S_c=S_c(e_c+S_c)$" and insert -- $S_c=S_c/(e_c+S_c)$ --.
Line 34, delete "$A_{6.2}$" and insert -- $A_{6.6}$ --.
Line 37, delete "$A_{6.2}$" and insert -- $A_{6.6}$ --.

Column 27,
Line 1, delete "calorimeter" and insert -- colorimeter --.
Line 7, after "in" delete ".".
Line 12, after "value" insert -- , --.
Line 27, delete "$^{TM}$" and insert -- ® --.
Line 32, delete "$LiB(C_6F_5)_4.Et_2O.3$" and insert -- $LiB(C_6F_5)_4 \cdot Et_2O \cdot 3$ --.

Column 30,
Line 5, delete the second "of".

Column 31,
TABLE 4, line 37, delete "Exp." and insert -- Expt. --.

Page 2 of 3

UNITED STATES PATENT AND TRADEMARK OFFICE
CERTIFICATE OF CORRECTION

PATENT NO.    : 6,329,450 B1
DATED         : December 11, 2001
INVENTOR(S)   : Ogoe et al.

It is certified that error appears in the above-identified patent and that said Letters Patent is hereby corrected as shown below:

Column 32,
Line 39, delete "$I_1$" and insert -- $I_2$ --.
Line 48, delete "methacryl ate" and insert -- methacrylate --.

Column 33,
Line 24, delete "0.061 1" and insert -- 0.0611 --.
Line 28, delete "ps".

Column 35,
Line 34, delete "polyamides,nylon-6" and insert -- polyamides, nylon-6 --.
Line 60, delete "norbomene" and insert -- norbornene --.

Column 38,
Line 5, delete "17" and insert -- 18 --.
Line 7, delete "18" and insert -- 19 --.

Signed and Sealed this

Fifteenth Day of April, 2003

JAMES E. ROGAN
*Director of the United States Patent and Trademark Office*